United States Patent
Lee et al.

(10) Patent No.: US 10,904,032 B2
(45) Date of Patent: Jan. 26, 2021

(54) MULTI-USE OPTICAL DATA, POWERLINE DATA, AND GROUND POWER INTERFACE FOR AN AIRPLANE

(71) Applicant: The Boeing Company, Chicago, IL (US)

(72) Inventors: Donald B. Lee, Shoreline, WA (US); Timothy M. Mitchell, Seattle, WA (US); Brian E. Ward, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/980,606

(22) Filed: May 15, 2018

(65) Prior Publication Data
US 2019/0356510 A1     Nov. 21, 2019

(51) Int. Cl.
| | |
|---|---|
| *H04B 10/00* | (2013.01) |
| *H04L 12/40* | (2006.01) |
| *G06F 1/26* | (2006.01) |
| *G06F 13/40* | (2006.01) |
| *G07C 5/00* | (2006.01) |
| *H01R 13/717* | (2006.01) |
| *H04B 10/25* | (2013.01) |

(52) U.S. Cl.
CPC ........ *H04L 12/40045* (2013.01); *G06F 1/266* (2013.01); *G06F 13/4068* (2013.01);
(Continued)

(58) Field of Classification Search
CPC ...... G02B 6/3817; G02B 6/32; G02B 6/3853; G06F 1/26; G06F 1/266; G06F 13/4068;
(Continued)

(56) References Cited

U.S. PATENT DOCUMENTS 5,696,635 A * 12/1997 Kastner ................ G02B 25/001
                                                                  359/433
6,069,698 A * 5/2000 Ozawa ................ A61B 5/0062
                                                                  356/511
(Continued)

FOREIGN PATENT DOCUMENTS

| EP | 2111691 | 10/2009 |
|---|---|---|
| EP | 2445119 | 4/2012 |

OTHER PUBLICATIONS

EP 19174268.3; European Search Report dated Oct. 22, 2019; 3 pages.

*Primary Examiner* — Hibret A Woldekidan
(74) *Attorney, Agent, or Firm* — Haynes and Boone, LLP

(57) ABSTRACT

Systems, methods, and apparatus for a multi-use optical data, powerline data, and ground power interface for an airplane are disclosed. A method for communicating data between a vehicle and a ground system comprises disposing a pin of a connector of a multi-use power interface, which is connected to the ground system, into a socket of a connector of the vehicle such that a lens located on an end of the pin mates with an interior surface of a bottom of the socket. The pin and the socket each comprise an optical portion and a power portion. The method further comprises providing, by the ground system, power to an onboard system on the vehicle via the power portions of the pin and socket. Further, the method comprises communicating data between the onboard system and the ground system via the optical portions and the power portions of the pin and socket.

20 Claims, 14 Drawing Sheets

(52) U.S. Cl.
CPC ......... *G07C 5/008* (2013.01); *H01R 13/7172* (2013.01); *H04B 10/2589* (2020.05); *H04L 2012/4028* (2013.01)

(58) Field of Classification Search
CPC .... H04B 10/40; H04B 10/2503; H04B 10/25; H04B 10/808; H04B 2203/5487; H04B 3/03; H04B 3/54; H04B 10/803; H04L 2012/4028; H04L 12/40045; G07C 5/008; H01R 13/7172; H01R 13/04; H01R 13/10
USPC ......... 398/115, 116, 117, 125, 164, 135, 121
See application file for complete search history.

(56) References Cited

U.S. PATENT DOCUMENTS

| | | | |
|---|---|---|---|
| 6,361,192 B1 * | 3/2002 | Fussell | F21V 13/02 362/331 |
| 6,781,525 B2 * | 8/2004 | Chen | G06F 1/266 341/22 |
| 7,298,942 B2 * | 11/2007 | Blasingame | G02B 6/4207 385/33 |
| 8,929,465 B2 | 1/2015 | Lee et al. | |
| 8,948,934 B2 | 2/2015 | Lee et al. | |
| 9,306,625 B2 | 4/2016 | Lee | |
| 9,436,569 B2 | 9/2016 | Lee et al. | |
| 9,658,405 B2 * | 5/2017 | Philippe | G02B 6/3883 |
| 9,684,135 B2 | 6/2017 | Mori et al. | |
| 9,876,533 B2 * | 1/2018 | Lee | H04B 3/54 |
| 9,929,774 B2 | 3/2018 | Lee | |
| 10,084,550 B2 * | 9/2018 | Lee | G06F 1/32 |
| 2010/0080563 A1 * | 4/2010 | DiFonzo | G06F 1/26 398/115 |
| 2011/0097039 A1 | 4/2011 | Zhao et al. | |
| 2013/0051024 A1 * | 2/2013 | Amit | H04B 10/40 362/259 |
| 2015/0051788 A1 * | 2/2015 | Lee | B64F 5/60 701/31.5 |
| 2016/0301481 A1 | 10/2016 | Lee et al. | |
| 2019/0356356 A1 * | 11/2019 | Lee | H04B 10/278 |

* cited by examiner

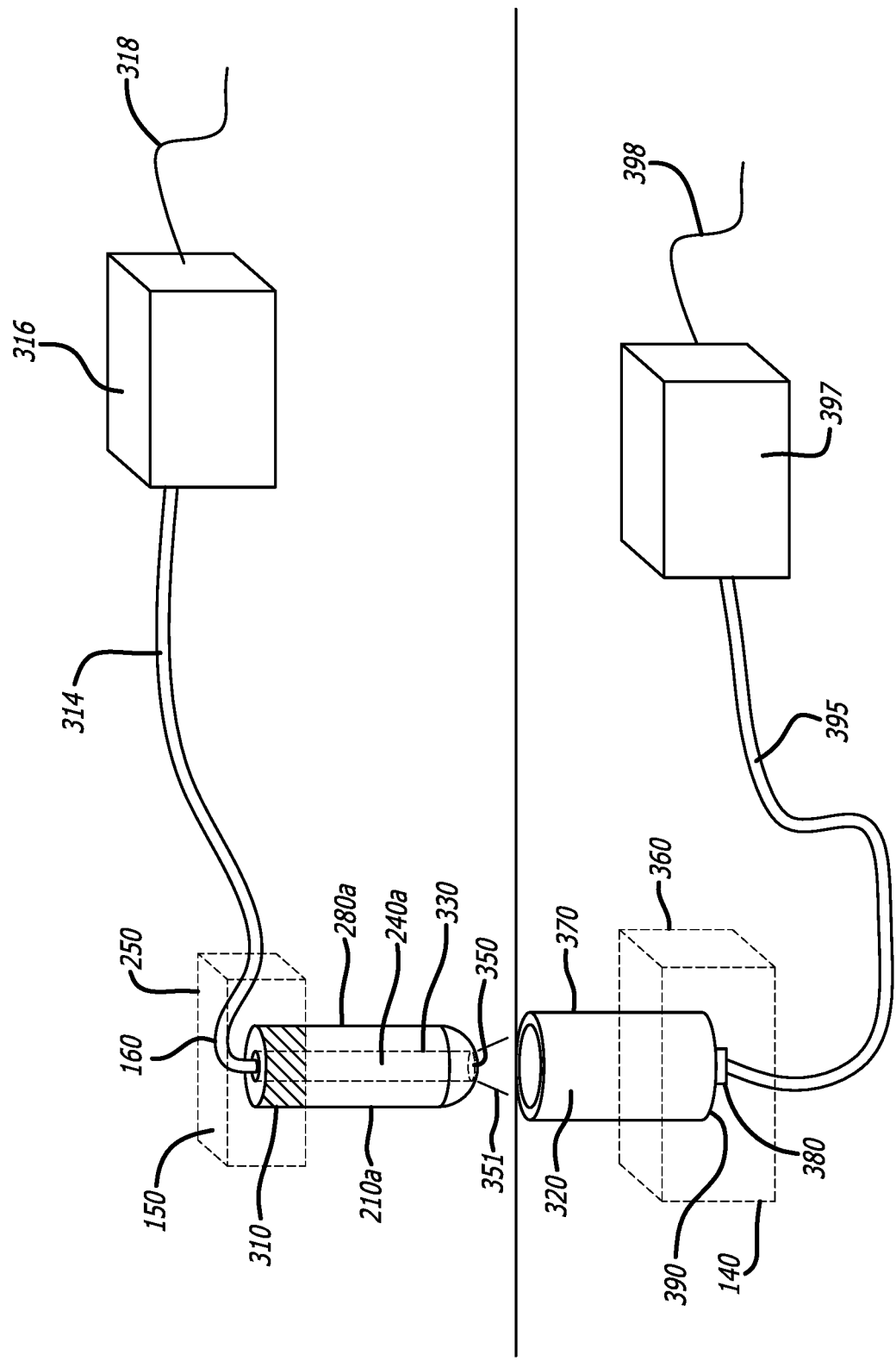

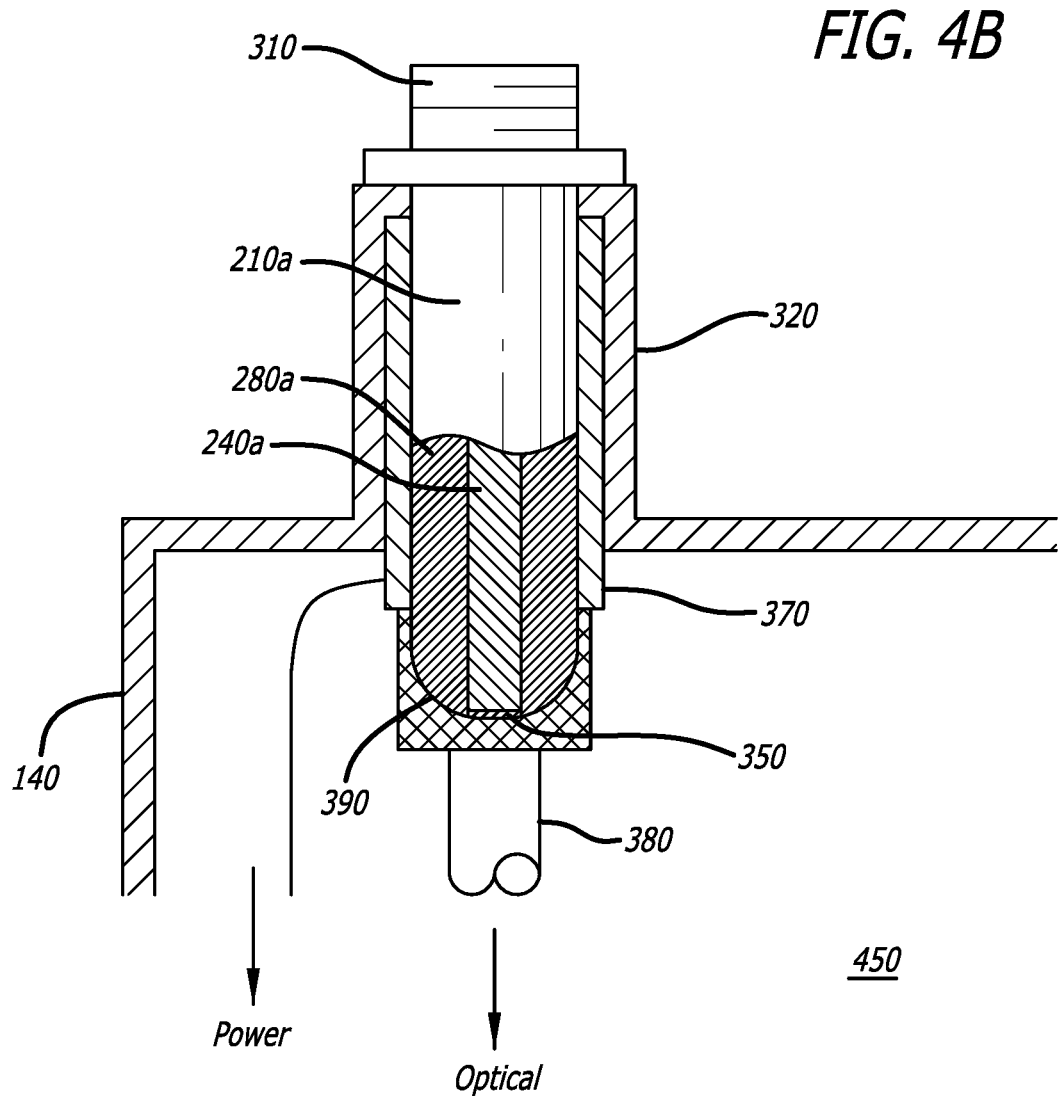

MULTI-USE OPTICAL DATA, POWERLINE DATA, AND GROUND POWER INTERFACE FOR AN AIRPLANE

FIELD

The present disclosure relates to multi-use power interfaces. In particular, it relates to a multi-use optical data, powerline data, and ground power interface for a vehicle (e.g., an airplane).

BACKGROUND

Systems operating onboard a vehicle may generate as well as receive significant amounts of data. For example, in the case of an aircraft, advanced avionics, in-flight entertainment systems, catering systems, passenger systems, and other on-board systems generate and/or utilize substantial amounts of data. As just one particular example for an aircraft, significant data is generated in connection with on-board monitoring systems, such as engine monitoring systems. Engine monitoring data may include, for example, compression ratios, rotations per minute, temperature, vibration, and other engine operational data. In addition, inflight entertainment systems for aircraft also can involve significant data, such as terabytes of data for a suite of movies.

Current and future airplane systems, such as avionics, video surveillance systems, inflight entertainment systems, and in military aircraft, the military electronics mission systems all require large data pipes to move data on and off the aircraft during passenger and equipment loading and unloading on the ground. For these airplane systems, many Gigabytes of data must be moved. The current data pipe bandwidth capacity in existing wireless off board communications solutions is not capable of moving this amount of data on or off an airplane within a reasonable timeframe. Hours or days are required to move these large data cashes onboard or off board the airplane.

Currently, data is transferred to and from an aircraft on the ground by using a combination of sneakernet (i.e. the manual delivery of physically carrying electronic data via, for example, a universal serial bus (USB) flash drive or hard drive) and radios (e.g., GateLink or a cellular modem) currently installed on the airplane to wirelessly transfer data. However, both of these conventional data transfer methods are slow. In addition, when utilizing radios for the data transfer, each radio data link incurs a usage charge and, as such, they are discouraged on the ground because they can be costly.

Demand for additional communication channels and data transfer needs is driving rapid change in connection with such communications. Such increased demand is due, for example, to increasing reliance by ground systems upon data from the aircraft, as well as increased communication needs of the flight crew, cabin crew, and passengers. In addition, data diversity along with an increasing number of applications producing and consuming data in support of a wide range of business processes puts additional demand on communications.

There is therefore a need for an improved technology for quickly transferring large amounts of data to and from a vehicle on the ground.

SUMMARY

The present disclosure relates to a method, system, and apparatus for a multi-use optical data, powerline data, and ground power interface for an airplane and for airplane factory automation. In one or more embodiments, a method for communicating data between a vehicle and a ground system comprises disposing a pin of a connector of a multi-use power interface, which is connected to the ground system, into a socket of a connector of the vehicle such that a lens located on an end of the pin mates with an interior surface of a bottom of the socket. In one or more embodiments, the pin and the socket each comprise an optical portion and a power portion. The method further comprises providing, by the ground system, power to an onboard system on the vehicle via the power portions of the pin and the socket. Further, the method comprises communicating at least a portion of the data between the onboard system and the ground system via the optical portions of the pin and the socket.

In one or more embodiments, the method further comprises communicating at least a portion of the data between the onboard system and the ground system via the power portions of the pin and the socket.

In at least one embodiment, the lens is concave shaped and the interior surface of the bottom of the socket is convex shaped. In some embodiments, the lens is convex shaped and the interior surface of the bottom of the socket is concave shaped.

In one or more embodiments, the method further comprises spreading, by the lens, a beam of an optical signal radiating from the optical portion of the pin.

In at least one embodiment, the vehicle is an airborne vehicle, a space vehicle, a terrestrial vehicle, or a marine vehicle.

In one or more embodiments, the data comprises aircraft control domain data, aircraft information systems data, and/or inflight entertainment data.

In at least one embodiment, the pin is removable from the connector of the multi-use power interface.

In one or more embodiments, the power comprises alternating current (AC) power.

In at least one embodiment, the onboard system is an avionics system, an aircraft control domain system, an aircraft information system, a video surveillance system, an inflight entertainment system, or a mission system.

In one or more embodiments, a system for communicating data between a vehicle and a ground system comprises the ground system connected to a multi-use power interface. The system further comprises the vehicle comprising a connector, which comprises a socket. Further the system comprises the multi-use power interface comprising a connector, which comprises a pin that is to be disposed into the socket such that a lens located on an end of the pin mates with an interior surface of a bottom of the socket. In one or more embodiments, the ground system is to provide power to an onboard system on the vehicle via power portions of the pin and the socket. In some embodiments, at least a portion of the data is communicated between the onboard system and the ground system via optical portions of the pin and the socket.

In at least one embodiment, at least a portion of the data is communicated between the onboard system and the ground system via the power portions of the pin and the socket.

In one or more embodiments, the lens is to spread a beam of an optical signal radiating from the optical portion of the pin.

In at least one embodiment, a method for communicating data between a vehicle and a ground system comprises receiving, by a vehicle bus multiplexer on the vehicle, the data via a plurality of vehicle data buses from an onboard system on the vehicle. The method further comprises multiplexing, by the vehicle bus multiplexer, the data into at least one data path of a multi-use power interface. Also, the method comprises transmitting, by the multi-use power interface via at least one data path, the data from the vehicle bus multiplexer to a ground bus multiplexer associated with the ground system. In addition, the method comprises demultiplexing, by the ground bus multiplexer, the data from at least one data path of the multi-use power interface into a plurality of ground data buses associated with the ground system. Further, the method comprises transmitting, by the ground bus multiplexer, the data via the plurality of ground data buses to the ground system.

In one or more embodiments, each of the vehicle data buses comprises an ARINC bus, a CAN bus, an RS bus, an optical bus, and/or an Ethernet bus. In some embodiments, each of the ground data buses comprises an ARINC bus, a CAN bus, an RS bus, an optical bus, and/or an Ethernet bus.

In at least one embodiment, at least one data path comprises an optical data path and/or a broadband over powerline (BPL) data path. In one or more embodiments, the optical portion of a pin on a connector of the multi-use power interface comprises the optical data path. In some embodiments, the power portion of a pin on a connector of the multi-use power interface comprises the BPL data path.

In one or more embodiments, the vehicle bus multiplexer is housed within the vehicle. In at least one embodiment, the ground bus multiplexer is housed within the ground system. In some embodiments, the data comprises aircraft control domain data, aircraft information systems data, and/or inflight entertainment data. In some embodiments, the onboard system is an avionics system, an aircraft control domain system, an aircraft information system, a video surveillance system, an inflight entertainment system, and/or a mission system. In at least one embodiment, the ground system is a ground power cart or test equipment.

In at least one embodiment, a method for communicating data between a ground system and a vehicle comprises receiving, by a ground bus multiplexer associated with the ground system, the data via a plurality of ground data buses associated with the ground system. The method further comprises multiplexing, by the ground bus multiplexer, the data into at least one data path of a multi-use power interface. Also, the method comprises transmitting, by the multi-use power interface via at least one data path, the data from the ground bus multiplexer to a vehicle bus multiplexer on the vehicle. In addition, the method comprises demultiplexing, by the vehicle bus multiplexer, the data from at least one data path of the multi-use power interface into a plurality of vehicle data buses on the vehicle. Further, the method comprises transmitting, by the vehicle bus multiplexer, the data via the plurality of vehicle data buses to an onboard system on the vehicle.

In one or more embodiments, a system for communicating data between a vehicle and a ground system comprises a vehicle bus multiplexer on the vehicle to receive the data via a plurality of vehicle data buses from an onboard system on the vehicle, and to multiplex the data into at least one data path of a multi-use power interface. Further, the system comprises the multi-use power interface to transmit via at least one data path the data from the vehicle bus multiplexer to a ground bus multiplexer associated with the ground system. Further, the system comprises the ground bus multiplexer to demultiplex the data from at least one data path of the multi-use power interface into a plurality of ground data buses associated with the ground system, and to transmit the data via the plurality of ground data buses to the ground system.

In at least one embodiment, a method for establishing a connection for the transfer of data from a vehicle to a ground system via a multi-use power interface comprises authenticating, by at least one processor on the vehicle, the ground system by verifying (1) a voltage provided by the multi-use power interface is approximately an expected voltage, (2) a phase separation from a power provided by the multi-use power interface is approximately an expected phase separation, (3) a current provided by the multi-use power interface is approximately an expected current, (4) a broadband over powerline (BPL) link provided by the multi-use power interface is healthy, and/or (5) an optical link provided by the multi-use power interface is healthy. Further, the method comprises sending, by at least one processor, at least one command to at least one onboard system on the vehicle to transfer the data to the ground system via the multi-use power interface, if at least one processor authenticates the ground system.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 3 is a diagram showing an exemplary pin of the connector of the disclosed multi-use power interface positioned to mate with a socket of a connector on the vehicle, where the exemplary pin comprises a convex lens, in accordance with at least one embodiment of the present disclosure.

FIG. 4B is a detailed diagram showing an exemplary pin of the connector of the disclosed multi-use power interface mated with a socket of a connector on the vehicle, where the exemplary pin comprises a convex lens, in accordance with at least one embodiment of the present disclosure.

DESCRIPTION

Figure 1:
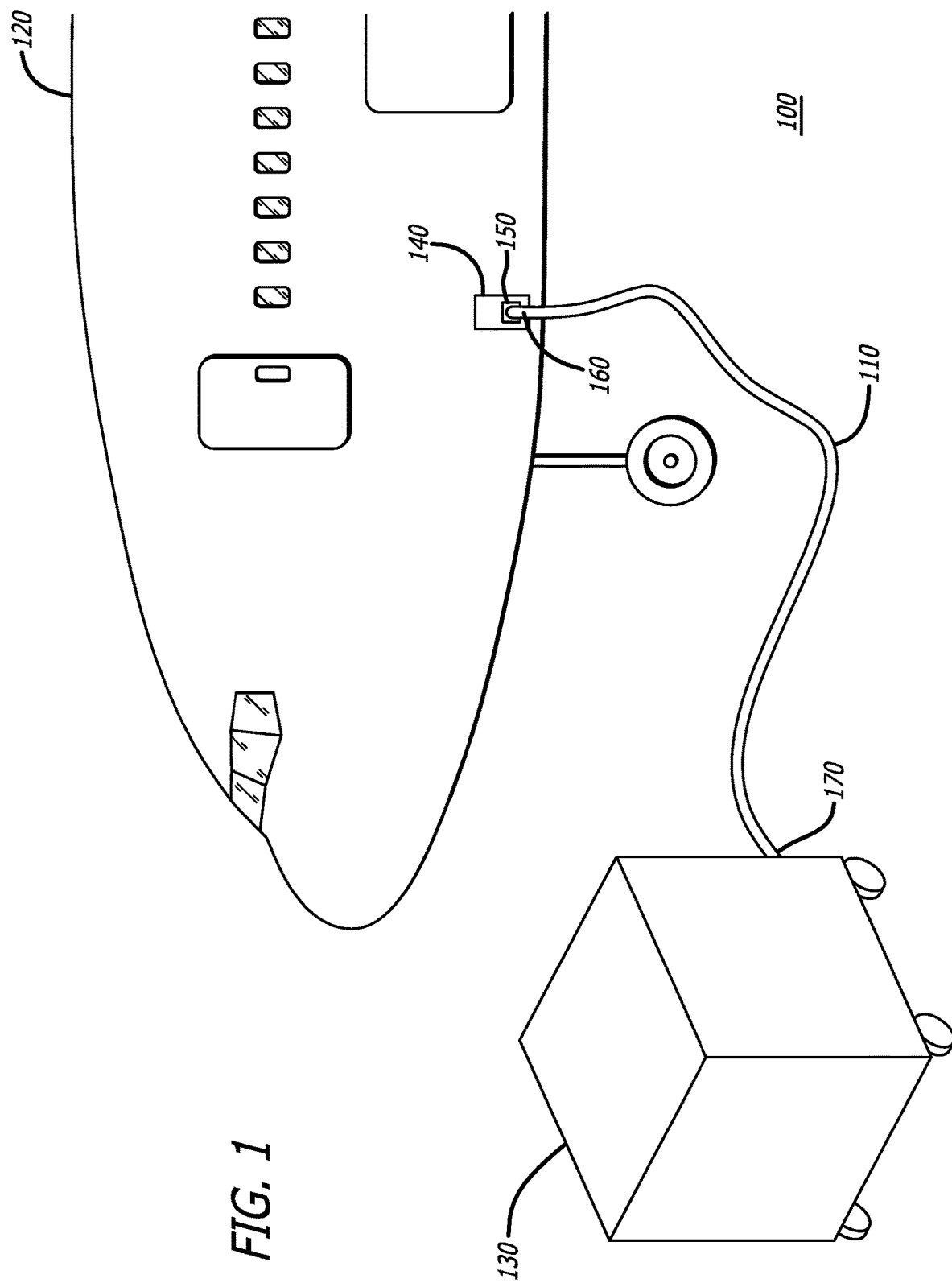
FIG. 1 is a diagram showing the disclosed multi-use power interface connected to an exemplary vehicle and an exemplary ground system, in accordance with at least one embodiment of the present disclosure.

The methods and apparatus disclosed herein provide an operative system for a multi-use optical data, powerline data, and ground power interface for an airplane and for airplane factory automation. In one or more embodiments, the system of the present disclosure allows for the transfer of large amounts of data to and from a vehicle on the ground at a faster raster rate than by conventional methods by employing a multi-use power interface that provides optical data paths (which employ concave or convex lenses for optimum data transfer), broadband over powerline (BPL) data paths, and three-phase alternating current (AC) power delivery to the vehicle. The disclosed multi-use power interface provides multiple Gigabit or higher communication links to and/or from a vehicle to and/or from a ground-based data network.

In addition, the system of the present disclosure also provides bus multiplexers utilized to multiplex signals from various vehicle data buses (along with analog discrete signals from test systems) into signals for the data paths (e.g., the optical data paths and the BPL data paths) of the disclosed multi-use power interface. The disclosed bus multiplexers are also utilized to de-multiplex signals from the data paths of the multi-use power interface back to the signals from the vehicle data buses (as well as the analog discrete signals from the test systems).

As previously mentioned above, systems operating onboard a vehicle (e.g., an aircraft) may generate as well as receive significant amounts of data. Current and future airplane systems, such as avionics, video surveillance systems, inflight entertainment systems, and in military aircraft, the military electronics mission systems all require large data pipes to move data on and off the aircraft during passenger and equipment loading and unloading on the ground. For these airplane systems, many Gigabytes of data must be moved. The current data pipe bandwidth capacity in existing wireless off board communications solutions is not capable of moving this amount of data on or off an airplane within a reasonable timeframe. Hours or days are required to move these large data cashes onboard or off board the airplane.

Currently, data is transferred to and from an aircraft on the ground by using a combination of sneakernet (i.e. the manual delivery of physically carrying electronic data via, for example, a universal serial bus (USB) flash drive or hard drive) and radios (e.g., GateLink or a cellular modem) currently installed on the airplane to wirelessly transfer data. However, both of these conventional data transfer methods are slow. In addition, when utilizing radios for the data transfer, each radio data link incurs a usage charge and, as such, they are discouraged on the ground because they can be costly.

For example, currently, when an airline needs to move surveillance system video and audio off an airplane after an incident, they must move between 8 to 16 Gigabyte (GB) of data, which can take days to weeks to "trickle-load" the data by using the existing wireless networks and/or by removing and replacing the network storage unit onboard the aircraft. In addition, when an inflight entertainment system needs to be reloaded with new content, around 32 GB of data must be loaded onto a server in a back office and then the server is swapped with one that is currently installed onboard the aircraft. Also, for military mission systems, the data transfers must be done by removing an old storage unit and replacing it with a new unit. For all three cases, the current data pipe bandwidth capacity in existing wireless off-board communications solutions is not capable of moving this amount of data on or off the airplane within a reasonable timeframe. Hours, days, or weeks are required to move these large data cashes onboard or off board the airplane by using the current off board systems.

The system of the present disclosure incorporates multiple fiber (e.g., 1-10 gigabyte (Gb)) optic data links (which utilize concave or convex lenses) and multiple broadband over powerline (BPL) data links into a conventional three-phase alternating current (AC) power interface (referred to as a Stinger cable) to form a multi-use power interface to provide a high bandwidth solution for efficiently and speedily transferring data to and from a vehicle on the ground. The disclosed multi-use power interface may be utilized at commercial and military airports utilizing a 400 hertz (Hz) aircraft power infrastructure. In addition, when a wired 400 Hz power infrastructure is not available, the disclosed multi-use power interface may be utilized at regional or military airfields where the operators utilize portable self-contained ground power carts to provide AC power to the airplane while the airplane engines are off. Both solutions only require one airplane onboard interface and one gatebox BPL/optical data link solution (configuration) for ground-based data off-board communication.

The disclosed system reduces the cost to the airplane operators by providing a single solution for all airfields, and reduces the cost to each regional and military airfield by providing a single solution for the airfield operations to support. Space inside the aircraft fuselage around the ground power interface (e.g., the Stinger cable) connection outlet on the aircraft is at a premium. By integrating the fiber optic links directly into the power interface (e.g., Stinger cable) power pins, a new directly coupled optical link is created, thereby resulting in a device that can be installed within the airplane quickly and easily with minimal to no impact to the airplane structure. As such, this ease in implementation reduces the barrier to entry for the disclosed system and will be critical in the worldwide adoption of the disclosed system into existing airport infrastructures.

Generally, the disclosed multi-use power interface facilitates providing power to vehicle onboard systems and communicating with such systems without requiring an additional interface/connector on the vehicle itself. More specifically, existing power connectors mounted to aircraft can be utilized for the power delivery and communications described herein. The benefits of a physical connection between the aircraft onboard systems and the ground system therefore can be achieved without the added cost and complexity associated with adding another physical connector to the vehicle. For example, the ground crew need not make an extra connection between the aircraft and ground system in utilizing the current system.

In addition, it should be noted that the disclosed system enables factory automation, airplane functional test, and airplane system test by replacing many thick functional test umbilical cables that run between the factory floor test system through the airplane doors and hatches to the internal airplane onboard systems with the disclosed multi-use power interface. One or more of the disclosed multi-use power interface, which comprises multiple optical data paths and multiple BPL data paths, provides the capacity and throughput needed to multiplex all of the test signals needed for factory automation, functional test, thereby greatly simplifying the required interface needed for testing. In addition, the disclosed system employs a bus multiplexer (e.g., ground bus multiplexer and a vehicle bus multiplexer) at each end of the multi-use power cable. These bus multiplexers multiplex signals from the many airplane data busses (e.g., ARINC-429 buses, CAN buses, RS-485 buses, optical buses, and Ethernet buses) and analog discrete signals from the test systems into signals for the data paths (e.g., the optical data paths and the BPL data paths) of the disclosed multi-use power interface. The bus multiplexers also de-multiplex signals from the data paths of the multi-use power interface back to the signals from the vehicle data buses and the analog discrete signals from the test systems.

The systems and methods described herein are sometimes described in the context of an airplane. Such systems and methods, however, are not limited to practice in connection with just airplanes and can be used in connection with any vehicle (e.g., an airborne vehicle, a space vehicle, a terrestrial vehicle, and a marine vehicle). As used herein, the term vehicle refers to any object capable of mobility, including aircraft, automobiles, ships, tanks, trucks, and locomotives. As used herein, the term aircraft refers to airplanes, helicopters, missiles, and any object capable of flight. Furthermore, the terms "data" broadly refers to information in any format. In addition, in one aspect, the systems and methods described herein facilitate communications between an aircraft and ground system upon arrival of the aircraft at a gate.

It should be noted that the disclosed systems and methods also can be modified and utilized in combination with known power and communications systems and methods. For example, it is contemplated that some communications can still occur via power line communications, and wireless communications can also be used. With multiple communications modalities, one modality (e.g., power line communications) can be used as a fail-over mode in the event one of the other modalities is not operable. In addition, different modalities can be used to facilitate creating different domains for communicating, for example, commercial domain data and military domain data. As one example, the wireless domain could be used as the commercial domain, the optical fiber domain (e.g., optical data paths) could be used as the military domain, and the power domain (e.g., BPL data paths) could be used as the inflight entertainment domain. Of course, numerous alternatives are possible.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to data communication systems for vehicles, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIG. 1 is a diagram 100 showing the disclosed multi-use power interface 110 connected to an exemplary vehicle 120 and an exemplary ground system 130, in accordance with at least one embodiment of the present disclosure. In this figure, the vehicle 120 is an airplane. However, it should be noted that in other embodiments, various different types of vehicles may be employed for the vehicle 120 of the disclosed system including, but not limited to airborne vehicles (e.g., airplanes, aircraft, and helicopters), space vehicles (e.g., space planes and satellites), terrestrial vehicles (e.g., tanks, trucks, and locomotives), and marine vehicles (e.g., ships and boats).

In this figure, the vehicle (i.e. airplane) 120 includes a connector 140 mounted on the external surface of the body (e.g., fuselage) of the vehicle 120 so that the connector 140 is accessible to ground crew personnel. The connector 140 comprises a plurality of sockets (e.g., refer to socket 320 of FIG. 3).

Figure 2:
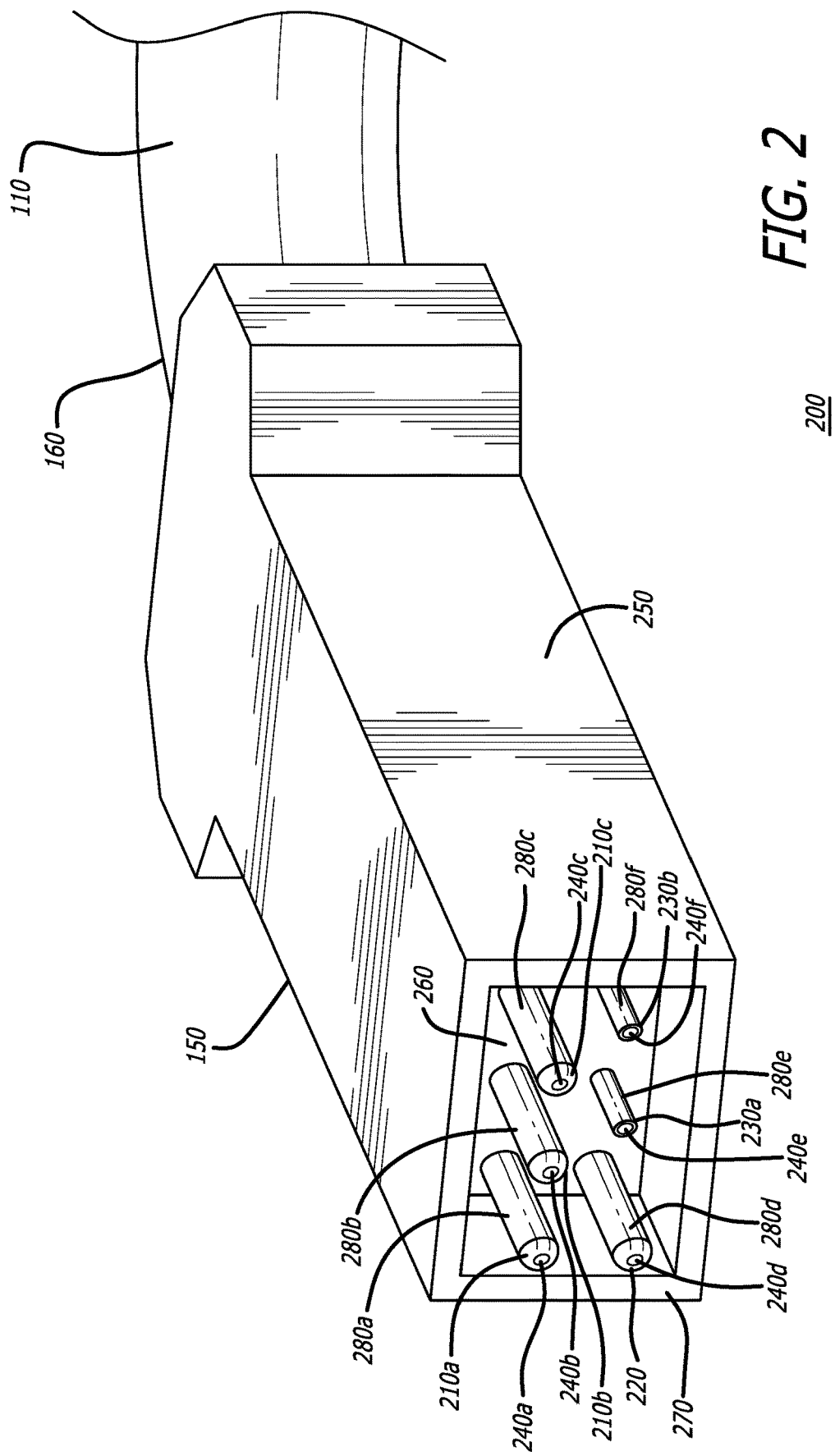
FIG. 2 is a diagram showing an exemplary pin interface of a connector of the disclosed multi-use power interface, in accordance with at least one embodiment of the present disclosure.

One end 160 of the multi-use power cable 110 includes a connector 150 (refer to FIG. 2). The connector 150 comprises a plurality of pins (e.g., refer to 210a, 210b, 210c, 220, 230a, 230b of FIG. 2). The other end 170 of the multi-use power cable 110 is connected to the ground system 130. It should be noted that although the ground system 130 is schematically illustrated as a ground power cart in FIG. 1, components of the ground system 130 may be integrated into other physical components, for example, at an airplane gate, such as into a jetway system.

When the vehicle 120 is on the ground, ground crew personnel connect the connector 150 of the multi-use power interface 110 to the connector 140 of the vehicle 120 to such that the connector 150 is electrically and communicatively coupled to the connector 140.

As will be explained in more detail below, the multi-use power interface 110 comprises both optical portions (e.g., an optical fiber(s) or fiber optic cable) and power portions (e.g., electrical conductive materials). Connectors 140 and 150 also comprise optical portions (e.g., an optical fiber(s) or fiber optic cable) and power portions (e.g., electrical conductive materials). During operation, data is transferred back and forth between at least one onboard system (not shown) on the vehicle 120 and the components in the ground system 130 via connectors 140 and 150 and the multi-use power interface 110. In addition, power is supplied to at least one onboard system (not shown) on the vehicle 120 from the ground system 130 via connectors 140 and 150 and the multi-use power interface 110.

In one or more embodiments, the onboard system(s) of the disclosed system may be various different types of systems including, but not limited to, an avionics system, an aircraft control domain system, an aircraft information system, a video surveillance system, an inflight entertainment system, and/or a mission system. In at least one embodiment, the data comprises at least one of aircraft control domain data (e.g., avionics data, flight management computer data), aircraft information systems data (e.g., weather data, aircraft state data, temperature data, winds data, runway location data, flight level for descent data), or inflight entertainment data (e.g., movies data, music data, games data).

It should be noted that in other embodiments, the vehicle 120 may comprise more than one connector 140 as is shown in FIG. 1. For these embodiments, separate multi-use power interfaces 110 will be connected respectively to the connectors 140 on the vehicle 120. In addition, for these embodiments, the multi-use power interfaces 110 may be connected to more than one ground system 130.

FIG. 2 is a diagram 200 showing an exemplary pin interface of a connector 150 of the disclosed multi-use power interface 110, in accordance with at least one embodiment of the present disclosure. The connector 150 mounts (e.g. mates) to the connector 140 (refer to FIG. 1) of the vehicle 120. The connector 150 comprises a housing 250 having an insulated base 260 and a sidewall 270 extending around the base 260.

As illustrated in FIG. 2, six pins 210a, 210b, 210c, 220, 230a, 230b extend from the base 260 of the connector 150. Each pin 210a, 210b, 210c, 220, 230a, 230b includes a power portion (which is an outer conductive portion that comprises an electrical conductive material, such as a metal) 280a, 280b, 280c, 280d, 280e, 280f and an optical portion (which comprises at least one optical fiber or a fiber optic cable) 240a, 240b, 240c, 240d, 240e, 240f. The optical portion 240a, 240b, 240c, 240d, 240e, 240f of each of the pins 210a, 210b, 210c, 220, 230a, 230b extends within and is coextensive (e.g., flush) with an end of the power portion 280a, 280b, 280c, 280d, 280e, 280f of the pin 210a, 210b, 210c, 220, 230a, 230b.

In one or more embodiments, the power portion 280a, 280b, 280c of pins 210a, 210b, 210c delivers three-phase alternating current (AC) power (i.e. each of the three pins 210a, 210b, 210c has a different sinusoidal phase) to the vehicle 120. Pin 220 is a neutral pin and operates as ground. Pins 230a, 230b are interlocking pins that are used to ensure that the pins 210a, 210b, 210c, 220 of the connector 150 are properly seated (e.g., mated) within the sockets (e.g., refer to socket 320 of FIG. 3) of the connector 140 of the vehicle 120. As such, during operation, to prevent the multi-use power interface 110 from being energized with power before the connector 150 is fully seated in connector 140 of the vehicle 120, the interlocking pins 230a, 230b will not allow the ground system 130 to provide power to the multi-use power interface 110 and vehicle 120 until the pins 210a, 210b, 210c, 220, 230a, 230b are all fully seated within the sockets (e.g., refer to socket 320 of FIG. 3) of connector 150. The interlocking pins 230a, 230b are shorter in length to ensure that the longer pins 210a, 210b, 210c, 220 of the connector 150 are fully seated in the sockets of connector 140 of the vehicle 120. This protective feature provided by the interlocking pins 230a, 230b provides arc flash mitigation (e.g., prevents arcing in the connector 150 to the aircraft 120) and provides safety to the ground crew (e.g., prevents the ground crew from being shocked by handling a loose multi-use power interface 110 that is energized).

The connector 150 is electrically connected to at least one onboard system (not shown) on the vehicle 120, and more particularly, each pin 210a, 210b, 210c, 220, 230a, 230b is connected to at least one such onboard system to provide power via the power portion 280a, 280b, 280c, 280d, 280e, 280f. In addition, each pin 210a, 210b, 210c, 220, 230a, 230b is connected to at least one such onboard system to enable communications (e.g., the transfer of data) via the power portion (e.g., broadband over powerline (BPL)) 280a, 280b, 280c, 280d, 280e, 280f and/or via the optical portion (e.g., optical communications over the optical fiber(s) or fiber optic cable) 240a, 240b, 240c, 240d, 240e, 240f.

The particular configurations for the connector 150 can vary widely depending on the particular vehicle 120 and onboard systems involved. The connector 150 shown in FIG. 2 is just one example connector. For example, the size and number of pins 210a, 210b, 210c, 220, 230a, 230b can vary. The particular arrangement of pins 210a, 210b, 210c, 220, 230a, 230b can also vary. In addition, the materials for the connector 150 selected may depend on the particular environment in which the vehicle 120 operates.

FIG. 3 is a diagram 300 showing an exemplary pin 210a of the connector 150 of the disclosed multi-use power interface 110 positioned to mate with a socket 320 of a connector 140 on the vehicle 120, where the exemplary pin 210a comprises a convex lens 350, in accordance with at least one embodiment of the present disclosure. In this figure, a first connector 150 that mounts to a connector 140 on a vehicle 120 is shown. Connector 150 of the multi-use power interface 110 includes a housing 250, sometimes referred to as a fiber optic/electrical transition block, and is schematically illustrated as having only one pin 210a.

The pin 210a comprises threads 310 on one of its ends. The pin 210a is attached to the connector 150 by screwing the threads 310 of the pin 210a within threads (not shown) formed inside of the connector 150. As such, the pin 210a is removable from the connector 150.

The Pin 210a further comprises a power portion 280a and an optical portion 240a extending within and coextensive with an end of the power portion 280a. The optical portion 240a comprises a fiber optic cable 330. Alternatively, the optical portion 240a may comprise one or more optical fibers. In addition, each optical fiber may be a single mode fiber or a multi-mode fiber. A fiber optic cable 314 extends from the optical portion 240a to an optical-to-Ethernet interface 316, and an Ethernet cable 318 extends from the optical-to-Ethernet interface 316. Fiber optic cable 314, optical-to-Ethernet interface 316, and Ethernet cable 318 are all housed within the multi-use power interface 110, which is connected to the ground system 130. The Ethernet cable 310 connects to systems in the ground system 130 that receive and/or provide data. Data provided by the ground system 130 can be communicated via Ethernet cable 318 and fiber optic cable 314 to optical portion 240*a*.

A convex lens (i.e. bulging outwards from the lens) 350 is mounted on the end of the fiber optic cable 330. The convex lens 350 spreads (or enlarges) a beam 351 of an optical signal radiating out from the optical portion 240*a* of the pin 210*a*. The convex lens 350 spreads the beam 351 by dispersing the beam 351 by means of refraction. The convex lens 350 may be a simple lens, which comprises a single piece of transparent material, or a compound lens that comprises several simple lenses (usually arranged along a common axis). The convex lens 350 may be manufactured from various different types of materials including, but not limited to, glass, plastic, and/or quartz. The materials are ground and polished or molded into the convex shape. The spreading of the beam 351 allows for sloppiness in the mating (e.g., crooked or not fully mated) of the pin 210*a* of the connector 150 of the multi-use power interface 110 with the socket 320 of the connector 140 on the vehicle 120.

A second connector 140 that forms part of a vehicle 120 is shown. Connector 140 includes a housing 360, sometimes referred to as a fiber optic/electrical transition block, and is schematically illustrated as having one socket 320. Socket 320 includes a power portion 370 and an optical portion 380 at the base 390 of power portion 370.

A fiber optic cable 395 extends from optical portion 380 to an optical-to-Ethernet interface 397, and an Ethernet cable 398 extends from the optical-to-Ethernet interface 397. Fiber optic cable 395, optical-to-Ethernet interface 397, and Ethernet cable 398 are carried onboard the vehicle 120 (e.g., they are all housed within the vehicle 120). Ethernet cable 398 connects to onboard systems on the vehicle 120 so that data generated by such systems can be communicated via Ethernet cable 398 and fiber optic cable 395 to optical portion 380. Connector 140 is electrically connected to onboard systems (not shown) on the vehicle 120, and more particularly, socket 320 is connected to at least one such onboard system to provide power via power portion 370 and enable communications via the optical portion 380 and/or the power portion 370.

More specifically, prior to operation, pin 210*a* is disposed into socket 320 so that pin 210*a* is secured within socket 320 with an interference fit. For example, ground crew may connect connector 150 with connector 140. Power supplied to socket 320 is transmitted through conductive portion 280*a* of pin 210*a* to power portion 370 of socket 320 and to onboard systems on the vehicle 120.

Data is transferred from onboard systems via Ethernet cable 398, interface 397, and fiber optic cable 395 to optical portion 380 illustrated as an optical fiber cable 330. An optical link is established between the optical portion 380 and optical portion 240*a*. Data is transmitted across such link and to the ground system 130 via the multi-use power interface 110. For example, the onboard system may collect data such as advanced avionics data, in-flight entertainment system data, catering system data, passenger system data, and/or engine monitoring data using a number of monitors onboard the vehicle 120, and transmit the data to the ground system 130 via the optical link.

In addition, data is transferred from onboard systems via the power portion 370 of socket 320 to the power portion 280*a* of pin 210*a*. A broadband over powerline (BPL) link is established between the power portion 370 and power portion 280*a*. Data is transmitted across such link and to the ground system 130 via the multi-use power interface 110. As such, the onboard system may collect data such as advanced avionics data, in-flight entertainment system data, catering system data, passenger system data, and/or engine monitoring data using a number of monitors onboard the vehicle 120, and transmit the data to the ground system 130 via the BPL link.

Of course, many variations of system are possible and contemplated. For example, the configuration and number of pins 210*a*, 210*b*, 210*c*, 220, 230*a*, 230*b* of connector 150 and sockets 320 of connector 140 may vary. In addition, the transmission mode and format of data communications utilized by onboard systems and ground system components and may vary from system to system, and from component to component. The system can be modified to accommodate such formats and transmission modes.

Figure 4A:
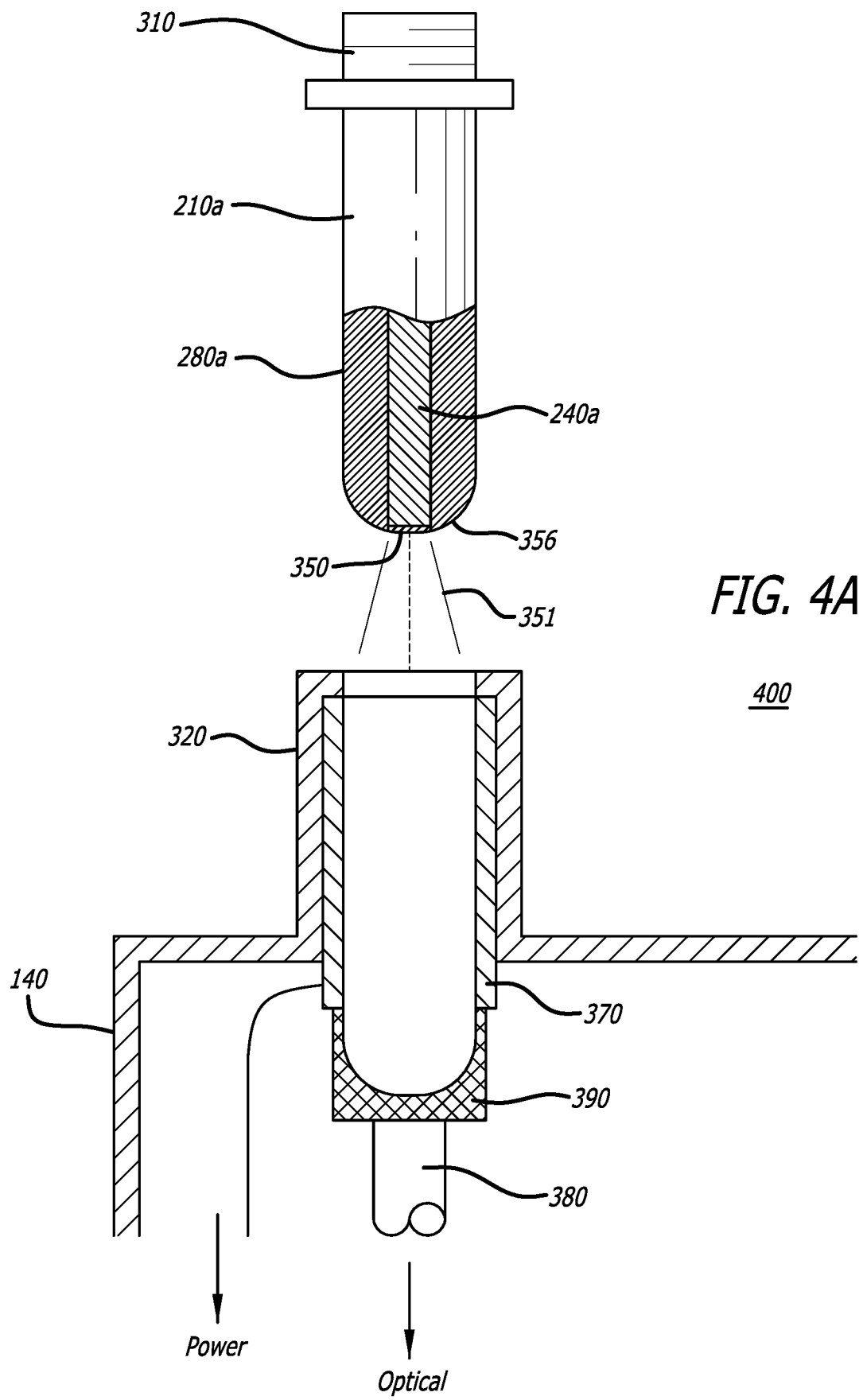
FIG. 4A is a detailed diagram showing an exemplary pin of the connector of the disclosed multi-use power interface positioned to mate with a socket of a connector on the vehicle, where the exemplary pin comprises a convex lens, in accordance with at least one embodiment of the present disclosure.

FIG. 4A is a detailed diagram 400 showing an exemplary pin 210*a* of the connector 150 of the disclosed multi-use power interface 110 positioned to mate with a socket 320 of a connector 140 on the vehicle 120, where the exemplary pin 210*a* comprises a convex lens 350, in accordance with at least one embodiment of the present disclosure. Pin 210*a* includes an outer power portion 280*a* and an optical portion 240*a* extending within and coextensive with an end 356 of the power portion 280*a*. Pin 210*a* also includes threads 310 to facilitate securing pin 210*a* within housing 250.

As shown in FIG. 4A, pin 210*a* is hollow, which facilitates securing optical portion 240*a*, which may be at least one optical fiber or a fiber optical cable, within pin 210*a*. In addition, threads 310 are configured to mate with threads in an opening in connector 150 of the multi-use power interface 110 so that pin 210*a* is readily and easily secured within the connector 150. In the event pin 210*a* is damaged or worn, pin 210*a* can be replaced, or removed and repaired, without having to remove the connector 150 from the multi-use power interface 110.

Also shown in FIG. 4A, connector 140 of the vehicle 120, comprises socket 320, which has a power portion 370 and an optical portion 380. The bottom 390 of the socket 320 is concave in shape such that it is complementary in shape to the convex lens 350.

FIG. 4B is a detailed diagram 450 showing an exemplary pin 210*a* of the connector of the disclosed multi-use power interface 110 mated with a socket 320 of a connector 140 on the vehicle 120, where the exemplary pin 210*a* comprises a convex lens 350, in accordance with at least one embodiment of the present disclosure. In this figure, the pin 210*a* is shown to be disposed into the socket 320 such that the convex lens 350 located at the end of the pin 210*a* mates with an interior surface of the bottom 390 of the socket 320. During operation, after the pin 210*a* mates with the socket 320, the ground system 130 provides power to at least one onboard system on the vehicle 120 via the power portion 280*a* of the pin 210*a* and the power portion 370 of the socket 320. Additionally, after the pin 210*a* mates with the socket 320, data is communicated between (i.e. to and/or from) the onboard system of the vehicle 120 and the ground system 130 via the optical portion 240*a* of the pin 210*a* and the optical portion 380 of the socket 320, and/or via the power portion 280*a* of the pin 210*a* and the power portion 370 of the socket 320.

Figure 5A:
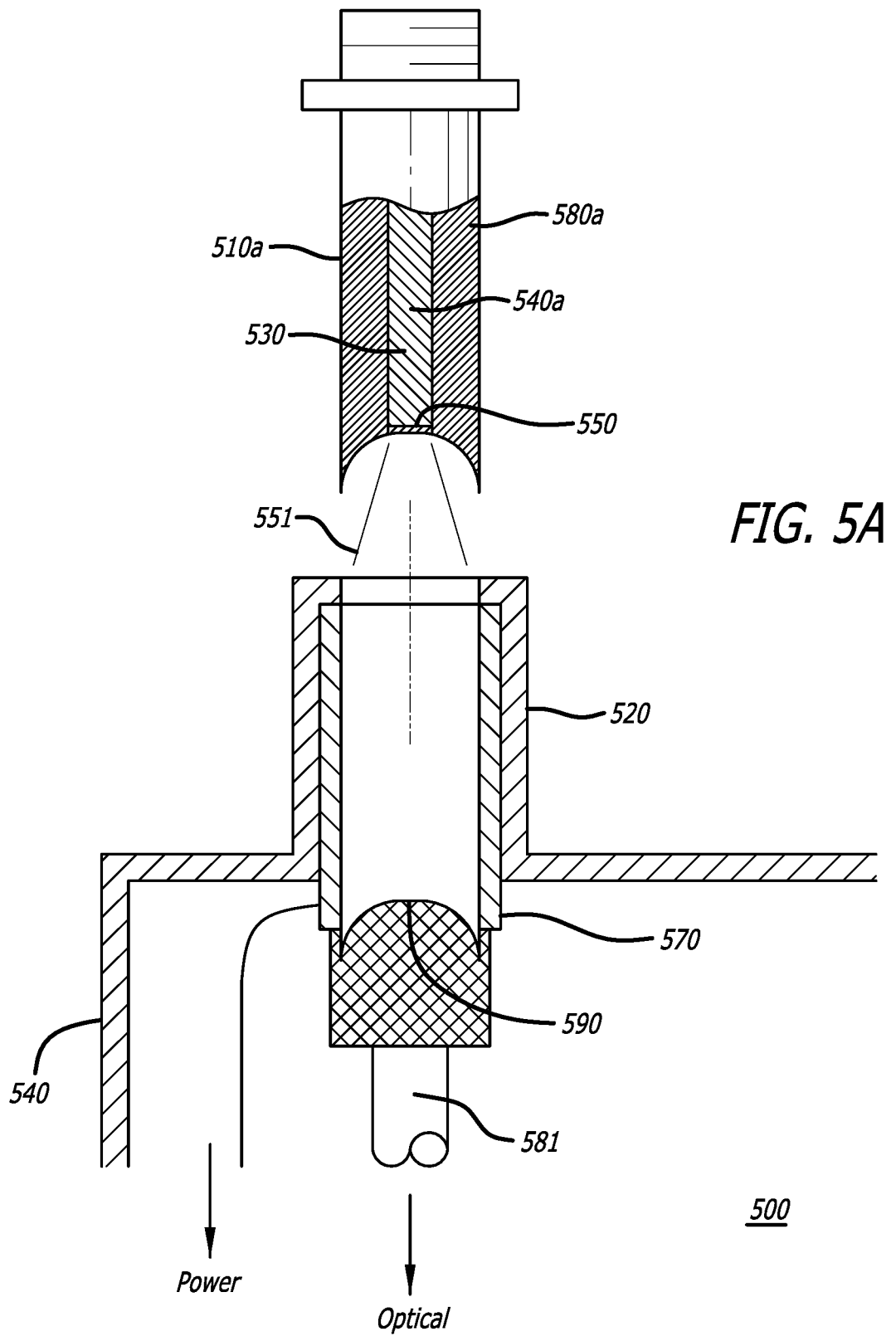
FIG. 5A is a detailed diagram showing an exemplary pin of the connector of the disclosed multi-use power interface positioned to mate with a socket of a connector on the vehicle, where the exemplary pin comprises a concave lens, in accordance with at least one embodiment of the present disclosure.

FIG. 5A is a detailed diagram 500 showing an exemplary pin 510*a* of the connector 150 of the disclosed multi-use power interface 110 positioned to mate with a socket 520 of a connector 540 on the vehicle 120, where the exemplary pin 510*a* comprises a concave lens 550, in accordance with at least one embodiment of the present disclosure. In this figure, the pin 510*a* of FIG. 5A is similar to the pin 210*a* of FIG. 4A, except that the pin 510*a* in FIG. 5A comprises a concave lens 550, while the pin 210a of FIG. 4A comprises a convex lens 350. In addition, the connector 540 FIG. 5A is similar to connector 140 of FIG. 4A, except that the bottom 590 of the socket 520 of the connector 540 of FIG. 5A is convex in shape, while the bottom 390 of the socket 320 of the connector 140 of FIG. 4A is concave in shape. The bottom 590 of the socket 520 is convex in shape such that it is complementary in shape to the concave lens 550.

A concave lens (i.e. depressed into the lens) 550 is mounted on the end of the fiber optic cable 530. The concave lens 550 spreads (or enlarges) a beam 551 of an optical signal radiating out from the optical portion 540a of the pin 510a. The concave lens 550 spreads the beam 551 by dispersing the beam 551 by means of refraction. The concave lens 550 may be a simple lens, which comprises a single piece of transparent material, or a compound lens that comprises several simple lenses (usually arranged along a common axis). The concave lens 550 may be manufactured from various different types of materials including, but not limited to, glass, plastic, and/or quartz. The materials are ground and polished or molded into the convex shape. The spreading of the beam 551 allows for sloppiness in the mating (e.g., crooked or not fully mated) of the pin 510a of the connector 150 of the multi-use power interface 110 with the socket 520 of the connector 540 on the vehicle 120.

Figure 5B:
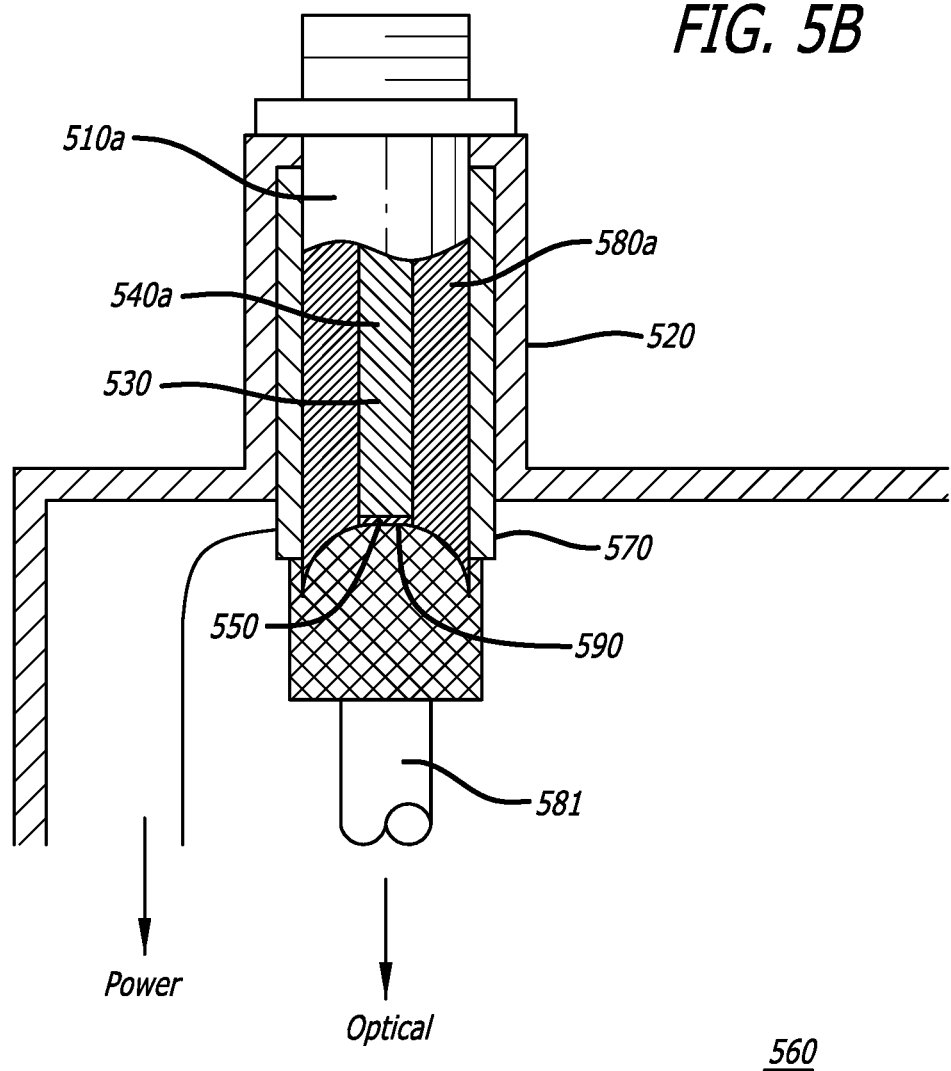
FIG. 5B is a detailed diagram showing an exemplary pin of the connector of the disclosed multi-use power interface mated with a socket of a connector on the vehicle, where the exemplary pin comprises a concave lens, in accordance with at least one embodiment of the present disclosure.

FIG. 5B is a detailed diagram 560 showing an exemplary pin 510a of the connector 540 of the disclosed multi-use power interface 110 mated with a socket 520 of a connector 540 on the vehicle 120, where the exemplary pin 510a comprises a concave lens 550, in accordance with at least one embodiment of the present disclosure. In this figure, the pin 510a is shown to be disposed into the socket 520 such that the concave lens 550 located at the end of the pin 510a mates with an interior surface of the bottom 590 of the socket 520. During operation, after the pin 510a mates with the socket 520, the ground system 130 provides power to at least one onboard system on the vehicle 120 via the power portion 580a of the pin 510a and the power portion 570 of the socket 520. Additionally, after the pin 510a mates with the socket 520, data is communicated between (i.e. to and/or from) the onboard system of the vehicle 120 and the ground system 130 via the optical portion 540a of the pin 510a and the optical portion 581 of the socket 520, and/or via the power portion 580a of the pin 510a and the power portion 570 of the socket 520.

Figure 6:
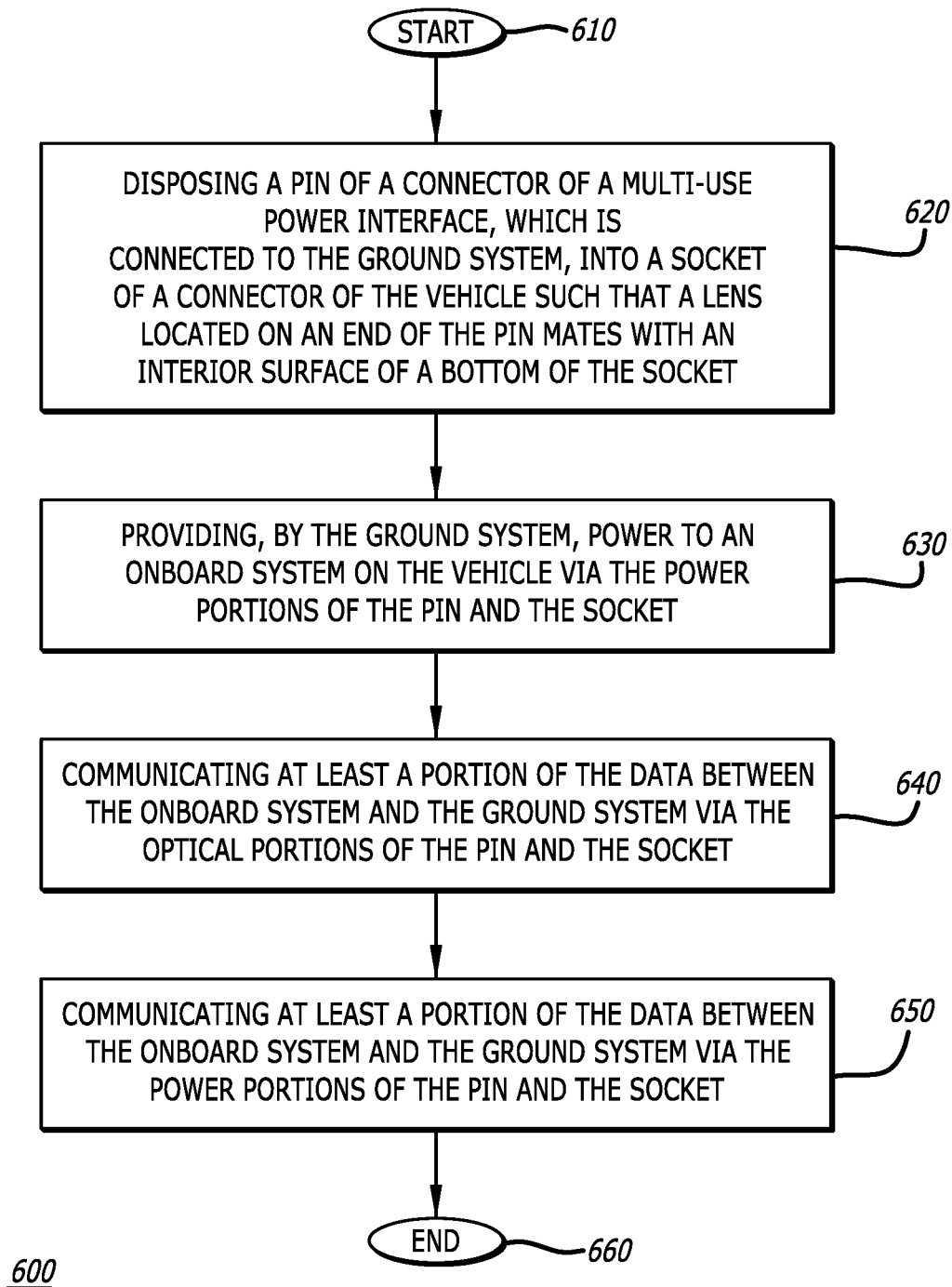
FIG. 6 is a flow chart showing the disclosed method for communicating data between a vehicle and a ground system, in accordance with at least one embodiment of the present disclosure.

FIG. 6 is a flow chart showing the disclosed method 600 for communicating data between a vehicle and a ground system, in accordance with at least one embodiment of the present disclosure. At the start 610 of the method 600, a pin of a connector of a multi-use power interface, which is connected to the ground system, is disposed into a socket of a connector of a vehicle such that a lens located on an end of the pin mates with an interior surface of a bottom of the socket 620. Then, the ground system provides power to an onboard system of the vehicle via the power portions of the pin and the socket 630. Also, at least a portion of the data is communicated between the onboard system and the ground system via the optical portions of the pin and the socket 640. In addition, at least a portion of the data is communicated between the onboard system and the ground system via the power portions of the pin and the socket 650. Then, the method 600 ends 660.

Figure 7:
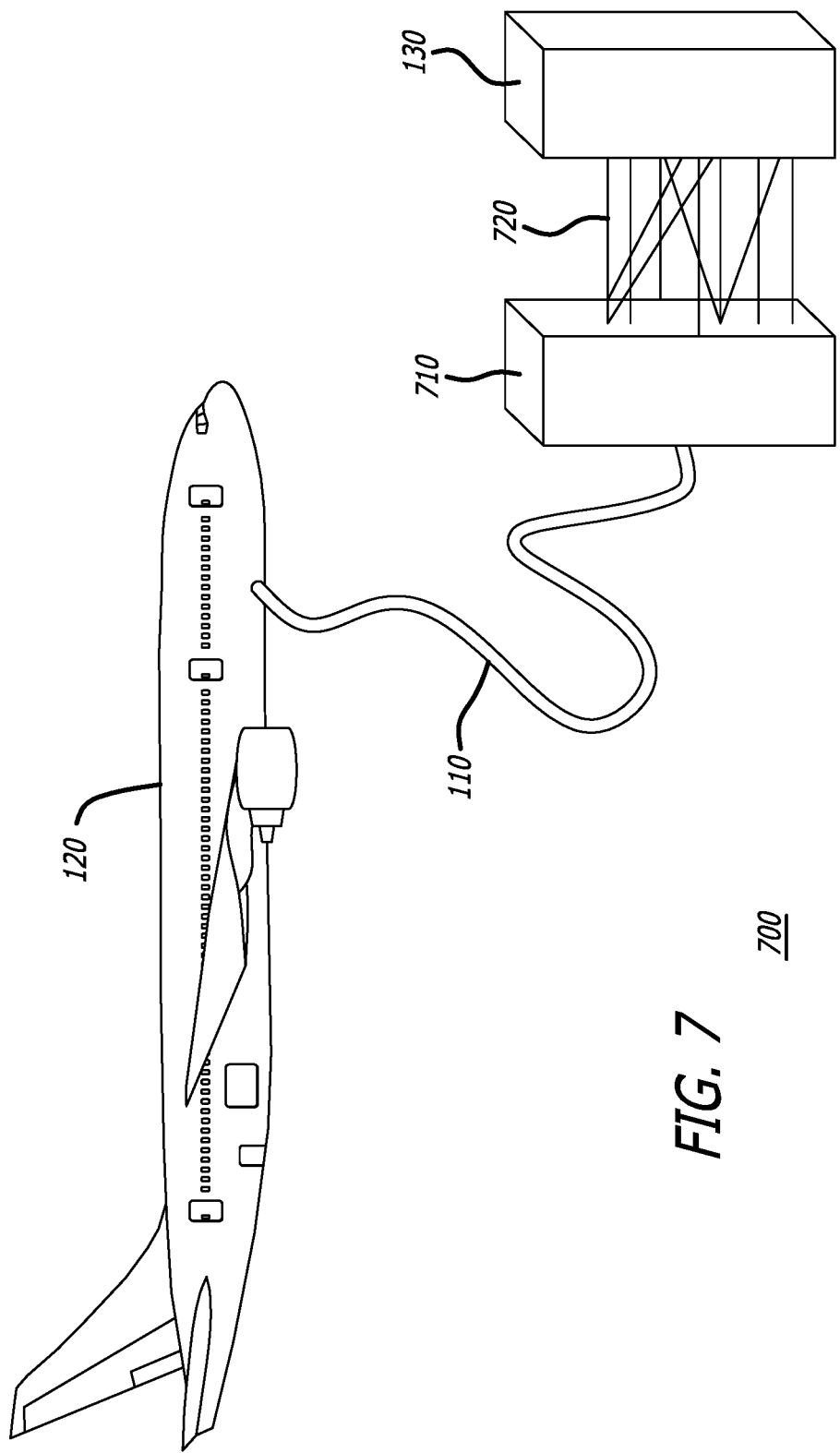
FIG. 7 is a diagram showing the disclosed multi-use power interface connected to an exemplary vehicle and a ground bus multiplexer on the ground, in accordance with at least one embodiment of the present disclosure.

FIG. 7 is a diagram 700 showing the disclosed multi-use power interface 110 connected to an exemplary vehicle 120 and a ground bus multiplexer 710 on the ground, in accordance with at least one embodiment of the present disclosure. The multi-use power interface 110 may be employed for factory automation, functional test, system test, and/or data transfer by utilizing bus multiplexers (e.g., a ground bus multiplexer 710 associated with the ground system 130 and a vehicle bus multiplexer (not shown in FIG. 7, refer to 810 in FIG. 8) located on (e.g., housed within) the vehicle 120) to complete the bus repeater system. The bus multiplexers (e.g., ground bus multiplexer 710 and vehicle bus multiplexer 810), which are connected to each other via the multi-use power interface 110, interface with the multiple buses (720, refer to 820 of FIG. 8) that are located on the onboard systems of the vehicle 120 as well as the multiple buses 720 on the ground system 130. In addition, in one or more embodiments, the bus multiplexers (e.g., ground bus multiplexer 710 and vehicle bus multiplexer 810) receive the data from the multiple buses 720, 820 and encode at least a portion of the received data as Ethernet packets. The Ethernet packets are modulated and transmitted over the multi-use power interface 110. The combination of the bus multiplexers (e.g., ground bus multiplexer 710 and vehicle bus multiplexer 810) and the multi-use power interface 110 (which comprises optical data paths and BPL data paths) enables a complete functional test interface harness, thereby reducing system complexity. Ethernet communications that is routed through the bus multiplexers is treated similar to routing the communications through an Ethernet switch.

In FIG. 7, the ground bus multiplexer 710 is shown to be connected to the multi-use power interface 110 and to the ground system 130 (which may be a factory automation rack, a functional test rack, a system test rack, test equipment, and/or a ground power cart). A plurality of data buses 720 are connected to the ground system 130 and to the ground bus multiplexer 710. In one or more embodiments, the data buses 720 and/or the ground bus multiplexer 710 are housed within the ground system 130.

In one or more embodiments, During operation of the disclosed system, the ground bus multiplexer receives the data from the data buses 720 and multiplexes the data from the data buses 720 into at least one data path (e.g., at least one optical data path on at least one optical portion 240a and/or at least one BPL data path on at least one power portion 280a) of the multi-use power interface 110. The data is then transmitted from the ground bus multiplexer 710 to the aircraft 120 via the multi-use power interface 110. A vehicle bus multiplexer (not shown in FIG. 7, refer to 810 of FIG. 8), which is located inside of the aircraft 120, will then demultiplex the data from the data path(s) of the multi-use power interface 110 into data buses (refer to 820 of FIG. 8), which are connected to at least one onboard system on the vehicle 120, and transmit the data via the data buses (refer to 820 of FIG. 8) to the onboard system(s) on the vehicle 120. In one or more embodiments, the onboard system(s) is an avionics system, an aircraft control domain system, an aircraft information system, a video surveillance system, an inflight entertainment system, and/or a mission system.

In addition, in one or more embodiments, during operation, the vehicle bus multiplexer 810 receives the data from the data buses (refer to 820 of FIG. 8), which are connected to at least one onboard system on the vehicle 120, and multiplexes the data from the data buses (refer to 820 of FIG. 8) into at least one data path (e.g., at least one optical data path on at least one optical portion 240a and/or at least one BPL data path on at least one power portion 280a) of the multi-use power interface 110. Then, the data is transmitted from the vehicle bus multiplexer 810 to the ground bus multiplexer 710 via the multi-use power interface 110. The ground bus multiplexer 710 will then demultiplex the data from the data path(s) of the multi-use power interface 110 into the data buses 720, and transmit the data via the data buses 720 to the ground system 130.

Figure 8:
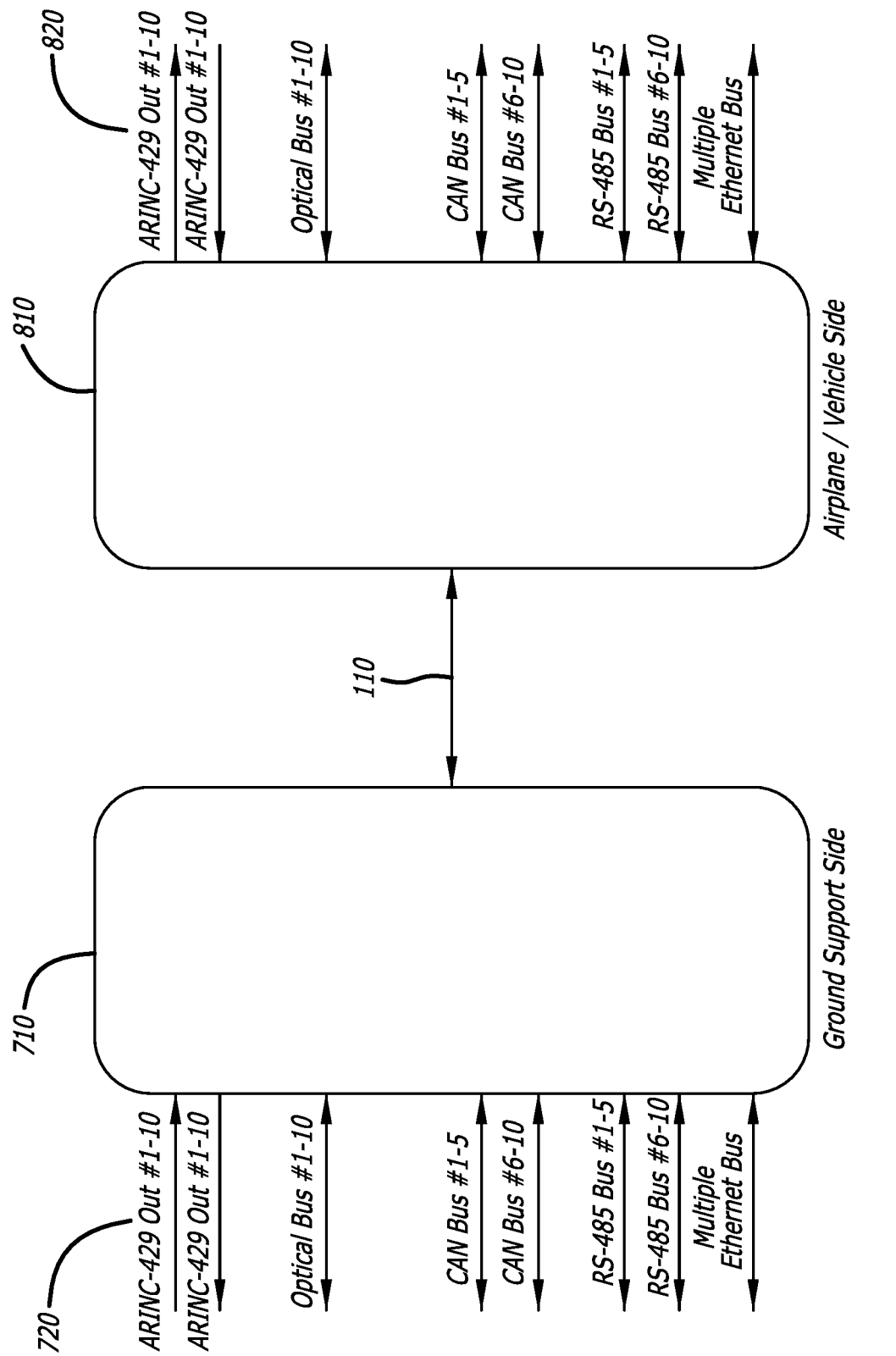
FIG. 8 is a diagram showing the disclosed multi-use power interface connected to a ground bus multiplexer on the ground and a vehicle bus multiplexer on the vehicle, in accordance with at least one embodiment of the present disclosure.

FIG. 8 is a diagram 800 showing the disclosed multi-use power interface 110 connected to a ground bus multiplexer 710 on the ground and a vehicle bus multiplexer 810 on the vehicle 120, in accordance with at least one embodiment of the present disclosure. In this figure, the multi-use power interface 110 is shown to be connected to the ground bus multiplexer 710 and the vehicle bus multiplexer 810. In addition, a plurality of data buses 720 are connected to the ground bus multiplexer 710. In one or more embodiments, various different types of data buses may be employed for the data buses 720 connected to the ground bus multiplexer 710 including, but not limited to, aeronautical radio, incorporated (ARINC) buses (e.g., ARIN-429), controller area network (CAN) buses, recommended standard (RS) buses (e.g., RS-485 or RS-232), optical buses, and/or Ethernet buses. Additionally, a plurality of data buses 820 are connected to the vehicle bus multiplexer 810. In one or more embodiments, various different types of data buses may be employed for the data buses 820 connected to the vehicle bus multiplexer 810 including, but not limited to, aeronautical radio, incorporated (ARINC) buses (e.g., ARIN-429), controller area network (CAN) buses, recommended standard (RS) buses (e.g., RS-485 or RS-232), optical buses, and/or Ethernet buses. It should be noted that at least one of the types of data buses employed for data buses 720 may be different than at least one of the types of data buses employed for data buses 820.

Figure 9A:
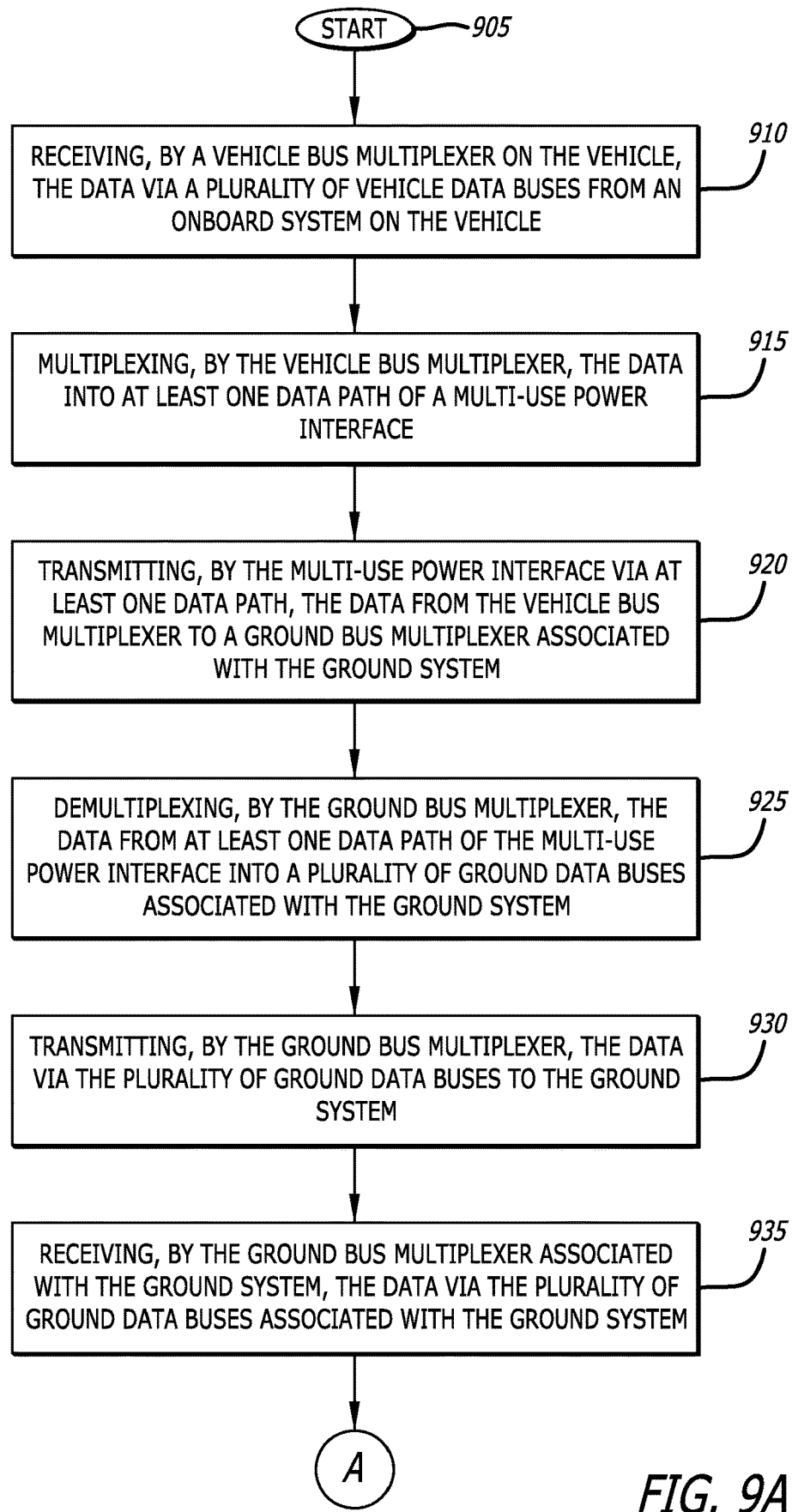
FIGS. 9A and 9B are a flow charts showing the disclosed method for communicating data between a vehicle and a ground system utilizing bus multiplexers, in accordance with at least one embodiment of the present disclosure.
Figure 9B:
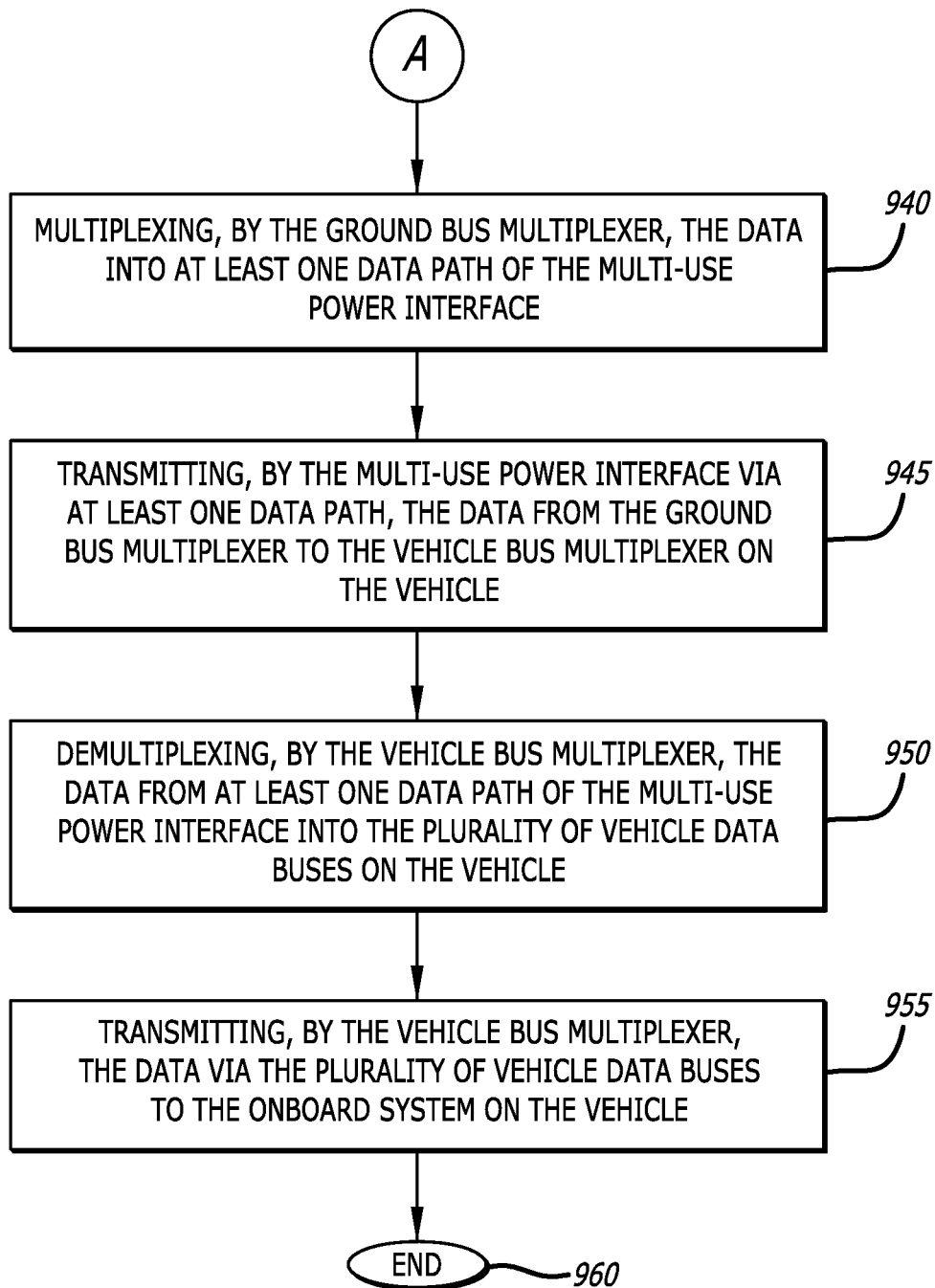

FIGS. 9A and 9B are a flow charts showing the disclosed method 900 for communicating data between a vehicle and a ground system utilizing bus multiplexers (e.g., ground bus multiplexer 710 and vehicle bus multiplexer 810), in accordance with at least one embodiment of the present disclosure. At the start 905 of the method 900, a vehicle bus multiplexer on the vehicle receives the data via a plurality of vehicle data buses from an onboard system on the vehicle 910. Then, the vehicle bus multiplexer multiplexes the data into at least one data path of a multi-use power interface 915. The multi-use power interface then transmits via at least one data path the data from the vehicle bus multiplexer to a ground bus multiplexer associated with the ground system 920. Then, the ground bus multiplexer demultiplexes the data from at least one data path of the multi-use power interface into a plurality of ground data buses associated with the ground system 925. The ground bus multiplexer transmits the data via a plurality of ground data buses to the ground system 930.

Also, the ground bus multiplexer associated with the ground system receives the data via the plurality of ground data buses associated with the ground system 935. The ground bus multiplexer then multiplexes the data into at least one data path of the multi-use power interface 940. Then, the multi-use power interface transmits via at least one data path the data from the ground bus multiplexer to the vehicle bus multiplexer on the vehicle 945. The vehicle bus multiplexer then demultiplexes the data from at least one data path of the multi-use power interface into the plurality of vehicle data buses on the vehicle 950. Then, the vehicle bus multiplexer transmits the data via the plurality of vehicle data buses to the onboard system on the vehicle 955. Then, the method 900 ends 960.

Figure 10:
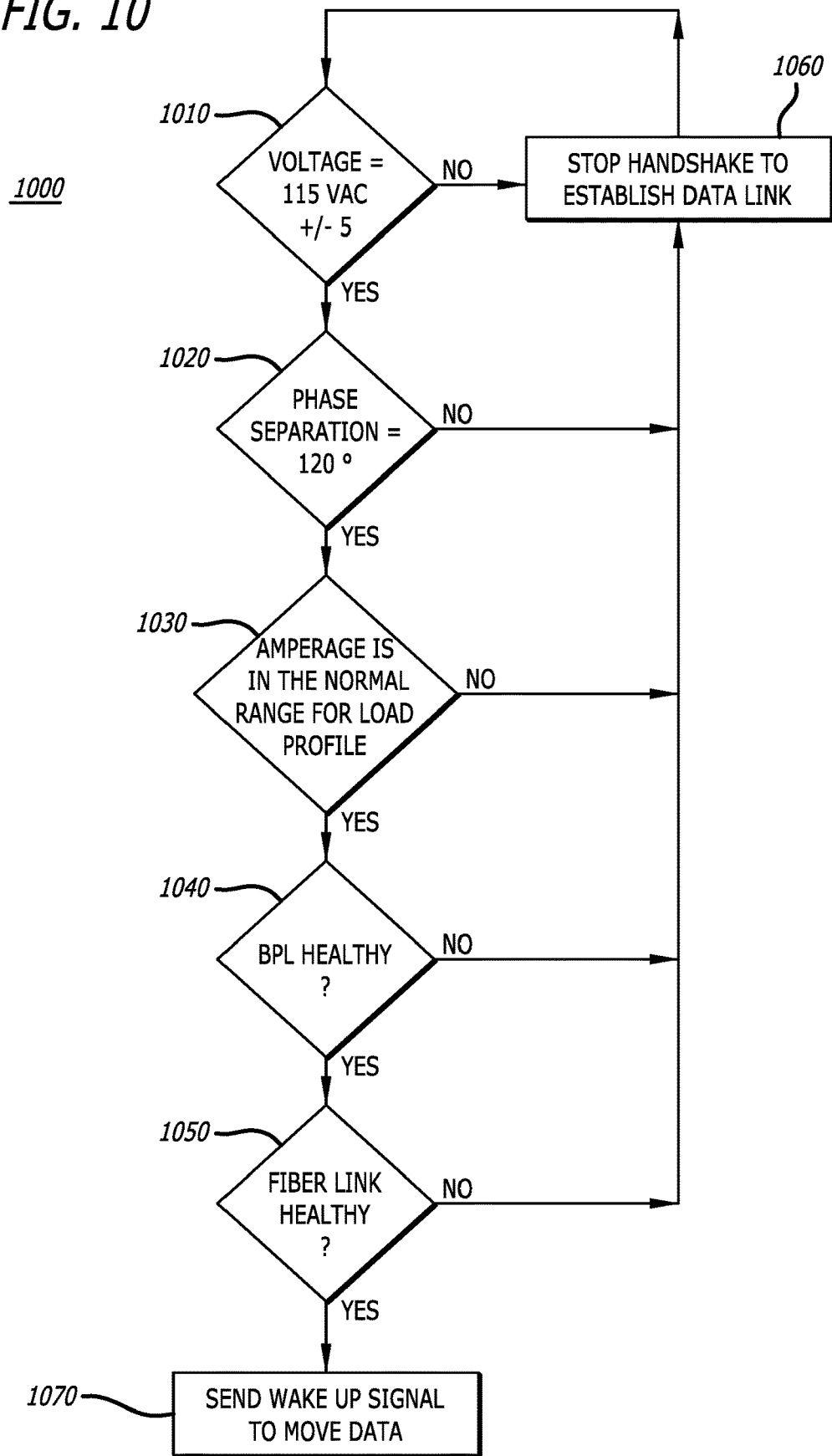
FIG. 10 is a flow chart showing the disclosed method for establishing a connection for the transfer of data from a vehicle to a ground system via the disclosed multi-use power interface, in accordance with at least one embodiment of the present disclosure.

FIG. 10 is a flow chart showing the disclosed method 1000 for establishing a connection for the transfer of data from a vehicle (e.g., an aircraft) 120 to a ground system 130 via the disclosed multi-use power interface 110, in accordance with at least one embodiment of the present disclosure. During operation of the disclosed system, once the ground crew connects the connector 150 of the multi-use power interface 110 to the connector 140 of the vehicle 120, at least one processor (e.g., at least one processor located on at least one onboard systems of the vehicle 120) must authenticate the ground system 130 before the processor(s) commands at least one onboard system to transfer data from the vehicle 120 to the ground system 130 via the multi-use power interface 110.

At the start of this method 1000 for establishing a connection for the transfer of data from a vehicle (e.g., an aircraft) 120 to a ground system 130, at least one processor authenticates the ground system 130 by verifying at least one of the following determinations (i.e. 1010, 1020, 1030, 1040, and/or 1050). For the first determination, the processor(s) determines whether the voltage provided by the multi-use power interface 110 is approximately an expected voltage (e.g., whether the voltage is 115+/−5 volts alternating current (Vac)) 1010. If the processor(s) determines that the voltage provided by the multi-use power interface 110 is not approximately an expected voltage, then the processor(s) ends the handshaking sequence with the ground system 130 to establish the data link 1060.

However, if the processor(s) determines that the voltage provided by the multi-use power interface 110 is approximately an expected voltage, then the processor(s) determines whether the phase separation from a power (e.g., a three-phase alternating current (AC) power) provided by the multi-use power interface 110 is approximately an expected phase separation (e.g., approximately 120 degrees) 1020. If the processor(s) determines that the phase separation from a power provided by the multi-use power interface 110 is not approximately an expected phase separation, then the processor(s) ends the handshaking sequence with the ground system 130 to establish the data link 1060.

However, if the processor(s) determines that the phase separation from a power provided by the multi-use power interface 110 is approximately an expected phase separation, then the processor(s) determines whether a current (e.g., amperage) provided by the multi-use power interface 110 is approximately an expected current (e.g., the amperage is in the normal range for the load profile) 1030. If the processor(s) determines that the current (e.g., amperage) provided by the multi-use power interface 110 is not approximately an expected current, then the processor(s) ends the handshaking sequence with the ground system 130 to establish the data link 1060.

However, if the processor(s) determines that the current provided by the multi-use power interface 110 is approximately an expected current, then the processor(s) determines whether the broadband over powerline (BPL) link provided by the multi-use power interface 110 is healthy (e.g., the BPL link is determined to be healthy if it is operating within an expected data rate range) 1040. However, if the processor(s) determines that the BPL link provided by the multi-use power interface 110 is not healthy, then the processor(s) ends the handshaking sequence with the ground system 130 to establish the data link 1060.

However, if the processor(s) determines that the BPL link provided by the multi-use power interface 110 is healthy, then the processor(s) determines whether the optical link (i.e. fiber link) provided by the multi-use power interface 110 is healthy (e.g., the optical link is determined to be healthy if it is operating within an expected data rate range) 1050. However, if the processor(s) determines that the optical link provided by the multi-use power interface 110 is not healthy, then the processor(s) ends the handshaking sequence with the ground system 130 to establish the data link 1060.

However, if the processor(s) determines that the optical link provided by the multi-use power interface 110 is healthy, then the processor(s) sends a command (e.g., at least one wake up command signal) to at least one onboard system on the vehicle 120 to transfer (i.e. move) the data from the vehicle 120 to the ground system 130 via the multi-use power interface 110. After the onboard system(s) receives the command(s), the onboard system(s) begins the transfer of the data to the ground system 130.

Figure 11:
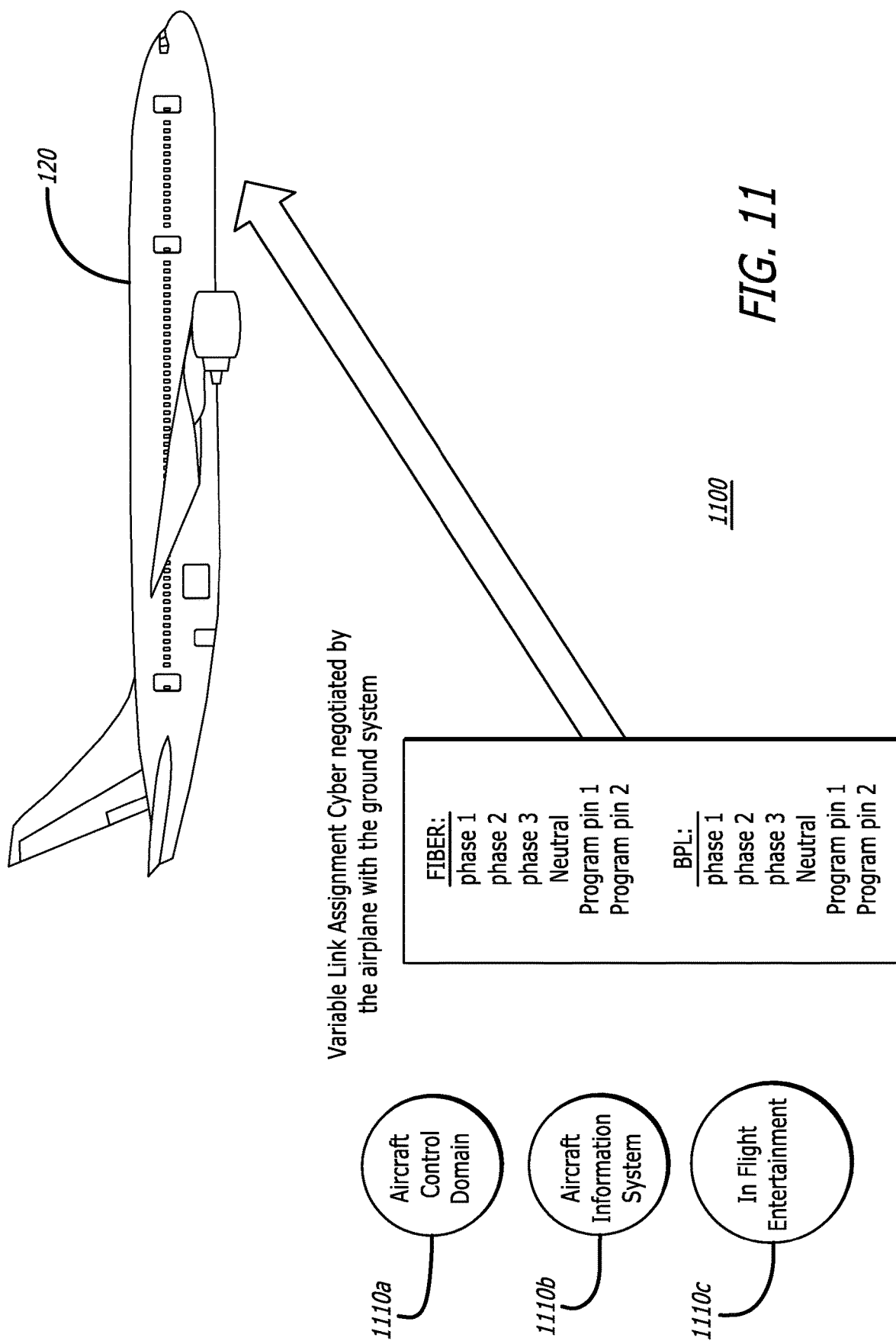
FIG. 11 is a schematic diagram showing the various different types of data for the vehicle that may be assigned to the different portions (e.g., optical portions and power portions) of the disclosed multi-use power interface, in accordance with at least one embodiment of the present disclosure.

FIG. 11 is a schematic diagram 1100 showing the various different types of data 1110a, 1110b, 1110c for the vehicle 120 that may be assigned to the different portions (e.g., optical portions 240a, 204b, 240c, 240d, 240e, 240f and power portions 280a, 280b, 280c, 280d, 280e, 280f) of the disclosed multi-use power interface 110, in accordance with at least one embodiment of the present disclosure. In particular, for the disclosed system, data is partitioned into at least one optical portion 240a, 240b, 240c, 240d, 240e, 240f of at least one pin 210a (phase 1), 210b (phase 2), 210c (phase 3), 220 (neutral), 230a (program pin 1), 230b (program pin 2) and/or at least one the power portion 280a, 280b, 280c, 280d, 280e, 280f of at least one pin 210a (phase 1), 210b (phase 2), 210c (phase 3), 220 (neutral), 230a (program pin 1), 230b (program pin 2) of the multi-use power interface 110. In one or more embodiments, the data that is partitioned may comprise aircraft control domain data 1110a (e.g., avionics data, flight management computer data), aircraft information systems data 1110b (e.g., weather data, aircraft state data, temperature data, winds data, runway location data, flight level for descent data), or inflight entertainment data 1110c (e.g., movies data, music data, games data). In at least one embodiment, how the data is specifically partitioned onto the optical portion(s) 240a, 240b, 240c, 240d, 240e, 240f of the pin(s) 210a (phase 1), 210b (phase 2), 210c (phase 3), 220 (neutral), 230a (program pin 1), 230b (program pin 2) and/or the power portion(s) 280a, 280b, 280c, 280d, 280e, 280f of the pin(s) 210a (phase 1), 210b (phase 2), 210c (phase 3), 220 (neutral), 230a (program pin 1), 230b (program pin 2) of the multi-use power interface 110 may be negotiated between at least one processor (e.g., of at least one onboard system) on the aircraft 120 with at least one processor of the ground system 130.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for communicating data between a vehicle and a ground system, the method comprising:
    disposing a pin of a connector of a multi-use power interface, which is connected to the ground system, into a socket of a connector of the vehicle such that a lens having a curved surface located on an end of the pin mates with a complementary curved interior surface of a bottom of the socket, wherein the pin and the socket each comprise an optical portion and a power portion;
    providing, by the ground system, power to an onboard system on the vehicle via the power portions of the pin and the socket; and
    communicating at least a portion of the data between the onboard system and the ground system via the optical portions of the pin and the socket.

2. The method of claim 1, wherein the method further comprises communicating at least a portion of the data between the onboard system and the ground system via the power portions of the pin and the socket.

3. The method of claim 1, wherein the curved surface of the lens is concave shaped and the complementary curved interior surface of the bottom of the socket is convex shaped.

4. The method of claim 1, wherein the curved surface of the lens is convex shaped and the complementary curved interior surface of the bottom of the socket is concave shaped.

5. The method of claim 1, wherein the method further comprises spreading, by the lens, a beam of an optical signal radiating from the optical portion of the pin.

6. The method of claim 1, wherein the vehicle is one of an airborne vehicle, a space vehicle, a terrestrial vehicle, or a marine vehicle.

7. The method of claim 1, wherein the data comprises at least one of aircraft control domain data, aircraft information systems data, or inflight entertainment data.

8. The method of claim 1, wherein the pin is removable from the connector of the multi-use power interface.

9. The method of claim 1, wherein the power comprises alternating current (AC) power.

10. The method of claim 1, wherein the onboard system is one of an avionics system, an aircraft control domain system, an aircraft information system, a video surveillance system, an inflight entertainment system, or a mission system.

11. A system for communicating data between a vehicle and a ground system, the system comprising:
    the ground system connected to a multi-use power interface;
    the vehicle comprising a connector, which comprises a socket; and
    the multi-use power interface comprising a connector, which comprises a pin that is to be disposed into the socket such that a lens having a curved surface located on an end of the pin mates with a complementary curved interior surface of a bottom of the socket, wherein the interior surface is curved, and wherein the ground system is to provide power to an onboard system on the vehicle via power portions of the pin and the socket, and at least a portion of the data is communicated between the onboard system and the ground system via optical portions of the pin and the socket.

12. The system of claim 11, wherein at least a portion of the data is communicated between the onboard system and the ground system via the power portions of the pin and the socket.

13. The system of claim 11, wherein the curved surface of the lens is concave shaped and the complementary curved interior surface of the bottom of the socket is convex shaped.

14. The system of claim 11, wherein the curved surface of the lens is convex shaped and the complementary curved interior surface of the bottom of the socket is concave shaped.

15. The system of claim 11, wherein the lens is to spread a beam of an optical signal radiating from the optical portion of the pin.

16. The system of claim 11, wherein the vehicle is one of an airborne vehicle, a space vehicle, a terrestrial vehicle, or a marine vehicle.

17. The system of claim 11, wherein the data comprises at least one of aircraft control domain data, aircraft information systems data, or inflight entertainment data.

18. The system of claim 11, wherein the pin is removable from the connector of the multi-use power interface.

19. The system of claim 11, wherein the power comprises alternating current (AC) power.

20. The system of claim 11, wherein the onboard system is one of an avionics system, an aircraft control domain system, an aircraft information system, a video surveillance system, an inflight entertainment system, or a mission system.

* * * * *